United States Patent
Yonekubo et al.

[11] Patent Number: 6,014,360
[45] Date of Patent: Jan. 11, 2000

[54] OPTICAL RECORDING MEDIUM HAVING A TRACK PITCH LESS THAN THE WAVELENGTH OF A LASER BEAM

[75] Inventors: Masatoshi Yonekubo; Toshio Arimura; Takao Miyazawa, all of Suwa, Japan

[73] Assignee: Seiko Epson Corporation, Tokyo, Japan

[21] Appl. No.: 08/952,017

[22] PCT Filed: Mar. 10, 1997

[86] PCT No.: PCT/JP97/00738

§ 371 Date: Nov. 14, 1997

§ 102(e) Date: Nov. 14, 1997

[87] PCT Pub. No.: WO97/35306

PCT Pub. Date: Sep. 25, 1997

[30] Foreign Application Priority Data

Mar. 18, 1996 [JP] Japan ................................ 8-061494

[51] Int. Cl.[7] .............................. G11B 7/135; G11B 7/09
[52] U.S. Cl. ...................... 369/112; 369/44.23; 369/109; 369/118; 369/275.4
[58] Field of Search ................................ 369/112, 275.4, 369/13, 109, 118, 44.12, 44.23

[56] References Cited

U.S. PATENT DOCUMENTS

| | | |
|---|---|---|
| 4,665,512 | 5/1987 | Ando . |
| 5,121,378 | 6/1992 | Hirose et al. ........................... 369/112 |
| 5,450,376 | 9/1995 | Matsumura et al. ...................... 369/13 |
| 5,600,620 | 2/1997 | Ohguri ................................... 369/112 |
| 5,625,613 | 4/1997 | Kato et al. .............................. 369/112 |
| 5,689,495 | 11/1997 | Tsuchiya et al. .................... 369/275.4 |
| 5,701,286 | 12/1997 | Sato ....................................... 369/109 |
| 5,796,683 | 8/1998 | Sumi et al. ............................... 369/13 |

FOREIGN PATENT DOCUMENTS

| | | |
|---|---|---|
| 0 545-133 | 11/1992 | European Pat. Off. . |
| 0 661-698 | 7/1995 | European Pat. Off. . |
| 2-294948 | 12/1990 | Japan . |
| 2-306440 | 12/1990 | Japan . |
| 4-216342 | 8/1992 | Japan . |
| 4-368647 | 12/1992 | Japan . |
| 5-217198 | 8/1993 | Japan . |
| 6-223401 | 8/1994 | Japan . |
| 7-287859 | 10/1995 | Japan . |
| 7-296414 | 11/1995 | Japan . |

*Primary Examiner*—John W. Cabeca
*Assistant Examiner*—Kim-Kwok Chu
*Attorney, Agent, or Firm*—Oliff & Berridge, PLC

[57] ABSTRACT

By using a semiconductor laser of a relatively long wavelength relative to the track pitch of an optical recording medium, and the optical super-resolution technique, there are provided an optical head and an optical recording apparatus which permit processing such as recording and regeneration onto and from a conventional CD-R with no problems, and processing of an optical recording medium of the DVD standard with a high recording density. In the optical head and the optical recording apparatus of the present invention, a semiconductor laser having a relatively long wavelength relative to the track pitch of an optical recording medium can be used. The invention therefore provides an optical head and an optical recording apparatus which overcome the limit on efforts toward a higher density, and permit recording and regeneration at a high recording density at a low cost with a high reliability. The invention provides also an optical head and an optical recording apparatus capable of coping with the tendency toward a higher density in the future.

38 Claims, 22 Drawing Sheets

FIG. 2(a)
Vertical component
FIG. 2(b)
Parallel component
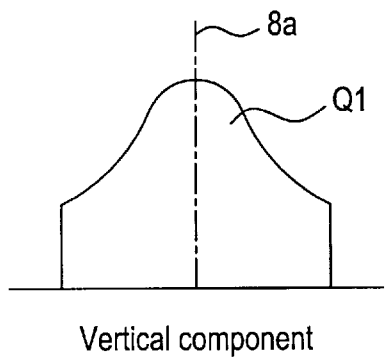
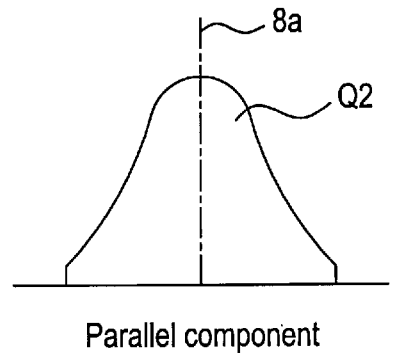
FIG. 3(a)
Vertical component
FIG. 3(b)
Parallel component
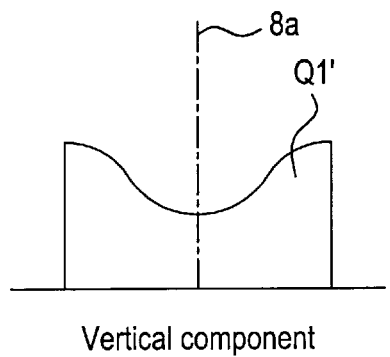
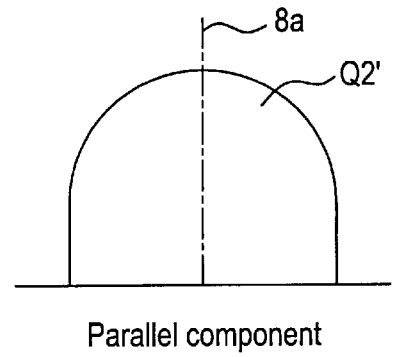
FIG. 4(a)
Vertical component
FIG. 4(b)
Parallel component
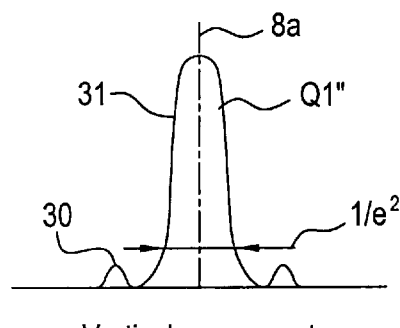
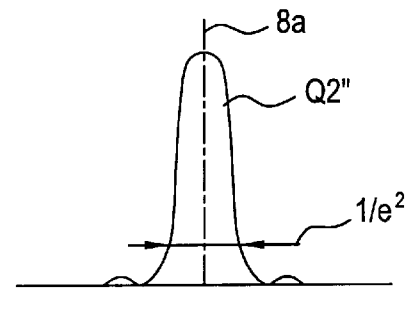

Intensity distribution of laser beam at incident pupil

Intensity distribution of laser at incident pupil

Vertical component

Parallel component

Vertical component

Parallel component

Vertical component

Parallel component

Vertical component

Parallel component

Vertical component

Parallel component

Vertical component

Parallel component

FIG. 23(a)
FIG. 23(b)
Track tangential direction →
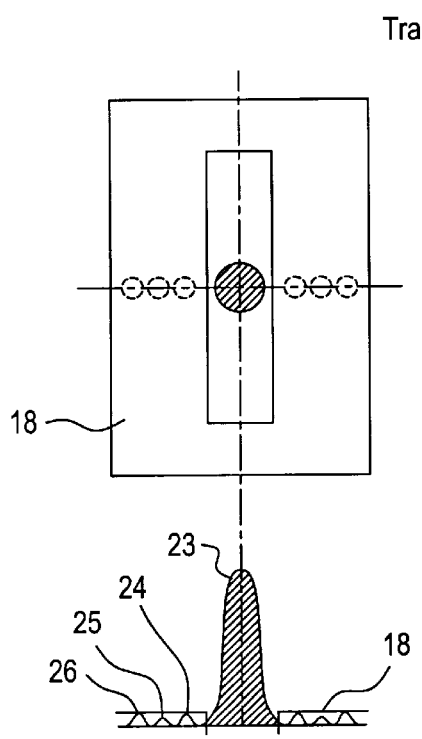
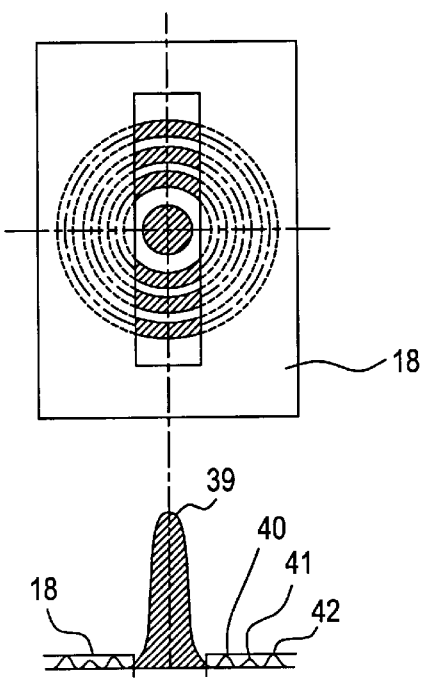

Track tangential direction →

FIG. 25(a)
FIG. 25(b)
Track tangential direction →
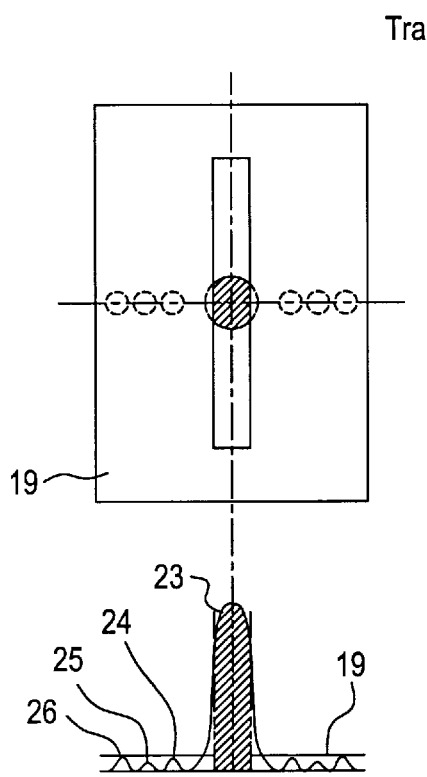
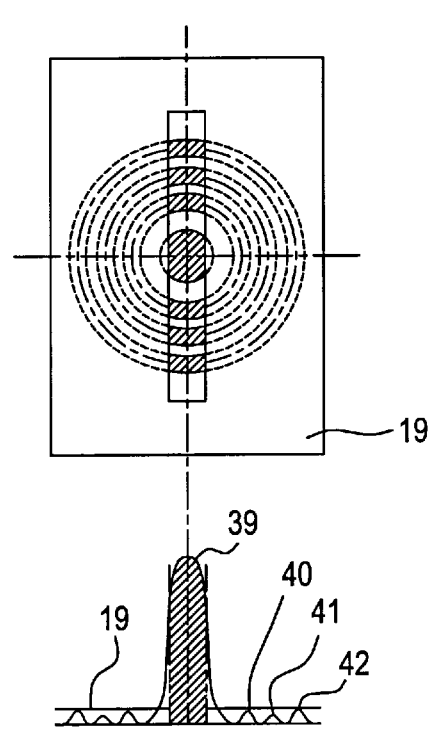

FIG. 26(a)
FIG. 26(b)
Track tangential direction
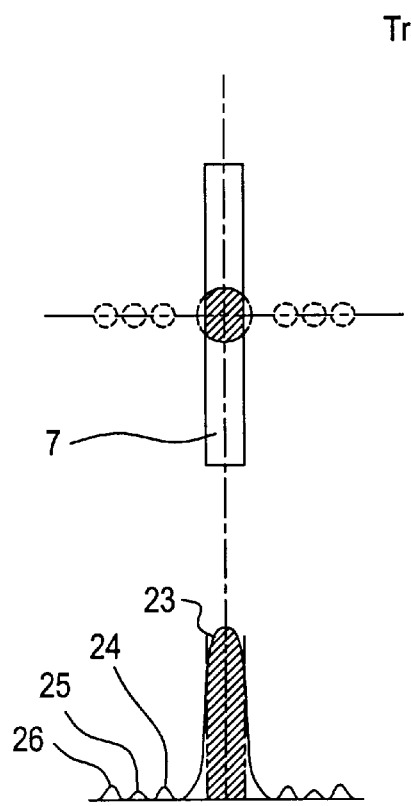
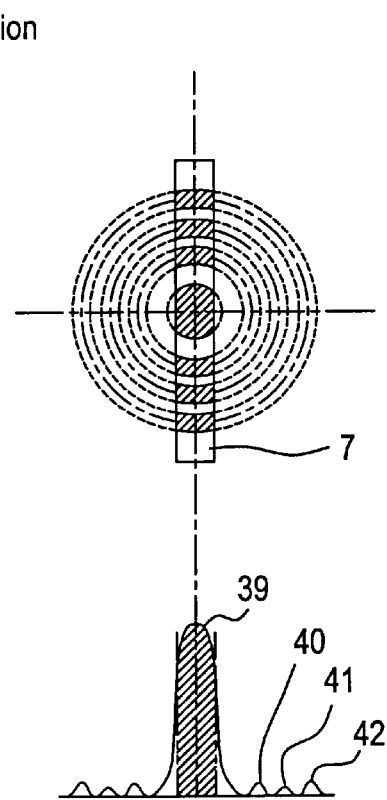

Track tangential direction

OPTICAL RECORDING MEDIUM HAVING A TRACK PITCH LESS THAN THE WAVELENGTH OF A LASER BEAM

FIELD OF THE INVENTION

The present invention relates to an optical head and an optical recording apparatus which perform a processing such as recording or regeneration onto or from an optical recording medium such as a digital video disk (DVD) or a compact disk (CD).

BACKGROUND TECHNOLOGY OF THE INVENTION

A commercially available optical disk at present such as a compact disk (CD) has a disk substrate thickness of 1.2 mm, and a pitch of 1.6 μm of a track for recording information. For the purpose of playing back such a CD, an optical head provided with a semiconductor laser emitting a laser beam having a wavelength of 0.78 μm and an objective lens having a numerical aperture (NA) of 0.45 is employed. Regenerating methods commonly used for processing an information signal derived by an optical head from a CD include waveform equalization based on a transversal equalizer or the like and a method based on digitization.

An optical disk having a recording density higher than that of a CD has recently been standardized to serve as an optical recording medium. The standardized specifications for a digital disk (DVD), one of the high-recording-density optical disks set forth a disk substrate thickness of 0.6 mm and a track pitch of 0.74 μm, and for this DVD, use is now considered of an optical head which irradiates a laser beam having a wavelength of 0.65 μm or 0.635 μm through an objective lens having a numerical aperture of 0.6. There is proposed an optical recording apparatus capable of processing optical disks of a plurality of specifications including not only an optical disk having a high recording density such as a DVD, but also conventional CDs.

However, a write-once type CD (CD-R) used as commonly as a CD at present cannot be employed in an optical recording apparatus playing back a DVD by the use of a laser beam of a short wavelength for DVD and capable also of playing back a CD. The CD-R is used for production of a slight quantity of CD-ROMs, data backup or trial manufacture of CDs, and is a dye-based optical recording medium having a high wavelength selectivity near the wavelength (0.78 μm) of a laser beam for a CD. In the proximity of the standard wavelength (0.65 μm), the reflectivity is too low to be practicable. Specifications for wavelengths of a laser beam used for recording or regeneration on or from an optical disk are usually determined by taking account of the track pitch. For a CD, for example, the ratio of the light source wavelength (0.78 μm) to the track pitch (1.6 μm) is 0.49, and for a DVD, the ratio of the light source wavelength (0.65 μm) to the track pitch (0.74 μm) is 0.88. All standards use a laser beam having a wavelength far shorter than the track pitch. In an optical recording apparatus using a laser beam having a short wavelength in conformity to these standards, therefore, regeneration is made possible for DVD and a read-only CD by using a two-focus hologram so as to condense the laser beam onto a CD and DVD having different disk thicknesses, whereas compatibility with a CD-R cannot be ensured in this case. Consequently, it is still necessary to use a separate optical recording apparatus based on a laser beam having a longer wavelength for the purpose of accomplishing recording or regeneration of a CD-R.

The present invention has therefore an object to provide an optical head and an optical recording apparatus which permit recording or regeneration in a group of a CD of any specifications for a DVD, a read-only CD and a CD-R. It is also an object of the invention to provide an optical head and an optical recording apparatus capable of processing a currently commercially available CD-R as well as a DVD permitting high-density recording with a single unit of head or apparatus. Another object of the invention is to provide an optical head and an optical recording apparatus which ensure compatibility of a digital video disk (DVD) and a next-generation high-density optical disk with a currently commercially available CD and a conventional write-once CD (CD-R), achievement of a further higher density, and expansion of manufacturing margin.

SUMMARY OF THE INVENTION

With a laser beam having a short wavelength meeting the DVD track pitch, as described above, it is impossible to process a CD-R. In the present invention, therefore, it is made possible to process an optical recording medium having a narrower track pitch such as a DVD, unlike the conventional standardized specifications, by irradiating a laser beam having a longer wavelength suitable for processing a CD-R, with a wavelength equal to, or longer than, the track pitch thereof. More specifically, the optical head of the invention having a laser source emitting a laser beam and an objective lens for condensing the laser beam onto an optical recording medium can perform any one of recording and regeneration of information onto or from the optical recording medium provided with an average track pitch substantially equal to, or narrower than, the wavelength of the laser beam. There is provided optical intensity distribution converting means which converts the optical intensity distribution of the laser beam entering the objective lens so that the laser beam emitted from the objective lens produces an optical super-resolution phenomenon, with a view to condensing the laser beam having a long wavelength with a spot diameter meeting the track pitch of the optical recording medium. The optical head of the invention has therefore a laser source emitting the laser beam, a condensing means which forms a spot having an intensity diameter of up to 1.3 times as long as the laser beam wavelength, and detecting means which detects a reflected beam reflected from the optical recording medium, and the condensing means comprises an objective lens facing the optical recording medium, and optical intensity distribution converting means which converts the optical intensity distribution of the laser beam entering the objective lens. The term intensity diameter used herein means a diameter having an intensity to the center of a laser beam of $1/e^2$.

In the optical head of the invention, an optical super-resolution phenomenon is produced by converting the optical intensity distribution at the incident pupil of the objective lens by the optical intensity distribution converting means, and there is thus available an optical spot smaller than with an ordinary optical system. It is therefore possible to condense the laser beam onto the optical recording medium so as to achieve an intensity diameter 1.3 times as long as the wavelength. Recording or regeneration is therefore possible even onto or from an optical recording medium having a track pitch substantially equal to, or narrower than, the laser beam wavelength. Even for a CD-R, processing is possible by means of a laser beam having a long wavelength meeting wavelength selectivity of the dye used therein. It is therefore possible to provide an optical head compatible with a high-density optical recording medium such as a DVD, as well as with an optical recording medium provided with a dye-based recording layer such as a CD-R.

An optical super-resolution phenomenon can be produced by achieving a higher intensity on the periphery of the objective lens than the intensity at the center on the incident pupil of the objective lens. Regarding the optical intensity distribution of the laser beam on the incident pupil, the ratio of optical intensity on the periphery to that at the center should preferably be within a range of from 1.5 to 3.5 times, or more preferably, up to three times, or further more preferably, about twice. When intensity on the periphery becomes excessively larger, the side lobe becomes larger, thus causing inconveniences. With a peripheral intensity of about twice as large as that at the center, the side lobe intensity is at a preferable level of about 10 to 15%. On the other hand, the phenomenon of the side lobe becoming larger can be positively utilized by the application of signal processing means based on the partial response method or a combination of the partial response method and the maximum-likelihood method.

Another feature is that there are provided a detecting lens which condenses a reflected beam reflected from the optical recording medium, detecting means which detects the thus condensed reflected beam, and means which shields at least a side lobe component in the track tangential direction of the optical recording medium near the condensation point of the laser beam condensed at the detecting means, and also means for removing inconveniences caused by the side lobe enlarged by the optical super-resolution phenomenon. By further shielding part of the main lobe, detrimental noise components mixed in the main lobe can be removed, thereby further improving the quality of a regeneration signal.

It is possible to use an aspherical optical system for the optical intensity distribution converting means. For example, the intensity distribution on the incident pupil can be converted by the use of a finite-system or infinite-system aspherical optical element. It is also possible to simultaneously achieve a collimating function of converting the laser beam into a parallel flux and an intensity distribution converting function by adopting an aspherical collimating lens. For the laser beam emitted from the laser source, a finite-system aspherical optical system may be used. Since an off-axis aberration is not corrected in this case, the relative position of the laser source and the aspherical optical system should preferably be fixed after adjustment. As the use of an aspherical optical system makes it possible to prevent loss of the laser beam in the optical intensity distribution converting means, this is suitable particularly for a writable (recordable) optical head of an optical recording apparatus requiring particularly a high optical output (optical intensity).

Means shielding the center portion on the incident pupil of the objective lens or filtering means giving a distribution to the transmissivity of the laser beam may be used as the optical intensity distribution converting means. These means, although accompanying a slight loss of laser beam, are suitable for an optical head or an optical recording apparatus dedicated exclusively for playback, because the optical system or the optical element can be provided at a low cost.

In the present invention, on the other hand, a method of providing means for imparting a phase difference to the laser beam entering the objective lens is also applicable as another method for causing the foregoing optical super-resolution phenomenon.

The optical head of the invention having a laser source emitting a laser beam, and an objective lens which condenses the laser beam onto an optical recording medium can perform at least any of recording and regeneration of information on or from the optical recording medium provided with an average track pitch substantially equal to, or narrower than, the wavelength of the laser beam. Because a laser beam of a long wavelength is condensed with a sport diameter meeting the track pitch of the recording medium, optical phase difference imparting means for imparting a phase difference to the laser beam entering the objective lens is provided so that the laser beam emitted from the objective lens produces an optical super-resolution phenomenon. The optical head of the invention has therefore a laser source emitting a laser beam, condensing means forming a spot having an intensity diameter of up to 1.3 times as long as the wavelength of the laser beam on the optical recording medium, and detecting means which detects a reflected beam reflected from the optical recording medium, wherein the condensing means is provided with an objective lens facing the optical recording medium, and the optical phase difference imparting means for imparting a phase difference to the laser beam entering the objective lens.

In the optical head of the invention, an optical super-resolution phenomenon is produced by imparting a phase difference to the laser beam entering the objective lens by the optical phase difference imparting means, and there is available an optical spot smaller than that in an ordinary optical system. It is therefore possible to condense the laser beam onto the optical recording medium so as to give an intensity diameter of up to 1.3 times the wavelength. Processing such as recording or regeneration can thus be performed even onto or from an optical recording medium having a track pitch substantially equal to, or narrower than, the wavelength of the laser beam. For a CD-R as well, processing is possible by means of a laser beam having a long wavelength meeting the wavelength selectivity of the dye used therein. Even for a high-density optical recording medium such as a DVD, as well as for an optical recording medium such as a CD-R provided with a dye-based recording layer, a compatible optical head can be provided.

An optical super-resolution phenomenon can be produced by imparting a phase difference to a part of the laser beam entering the objective lens. A phase difference of −180° should preferably be imparted to a plurality of belt-shaped regions having a longitudinal direction thereof agreeing with the radial direction of the optical recording medium. Or, a phase difference of −180° should preferably be imparted to a plurality of ring-shaped regions at the optical axial center of the laser beam entering the objective lens.

The main lobe diameter and the side lobe intensity vary with the ring width and the ring diameter or the belt width and the distance between the laser beam center and the belt. A preferable side lobe intensity of 10 to 5% of that of the main lobe is set forth by optimizing the foregoing ring width and ring diameter, or the belt width and the distance between the laser beam center and the belt. The increasing phenomenon of the side lobe can be positively utilized when using the partial response method described later or simultaneously using signal processing means based on combination of the partial response method and the maximum-likelihood method.

Applicable means for imparting a phase difference include filtering means comprising a substrate having a uniform refractive index provided with concave and convex portions on the surface thereof, and filtering means comprising a substrate with variable refractive index. Because a transparent substrate is used in both cases, it is possible to prevent loss of laser beam, and these methods are suitable for a writable (recordable) optical head or optical recording apparatus.

Further, the optical head of the invention comprises a detecting lens which detects a reflected beam reflected from the optical recording medium, detecting means which detects the condensed reflected beam, and means which shields at least the side lobe component in the track tangential direction of the optical recording medium near the focal point of the laser beam condensed in the detecting means, and is provided with means which removes inconveniences caused by the side lobe becoming larger by the foregoing optical super-resolution phenomenon. It is thus possible to remove the detrimental noise components from the side lobe mixing into an optical disk playback signal, thereby improving the quality of the playback signal. By further shielding part of the main lobe, it is possible to remove detrimental noise components mixing in the main lobe, and thus to further improve the quality of the playback signal.

The optical head of the invention has, on the other hand, a laser source emitting a laser beam, and an objective lens which condenses the laser beam onto an optical recording medium, in which it is possible to perform regeneration of information from the optical recording medium provided with an average track pitch substantially equal to, or narrower than, the wavelength of the laser beam, and comprises a condensing lens which condenses a reflected beam reflected from the optical recording medium without utilizing the foregoing optical super-resolution phenomenon, detecting means which detects the thus condensed reflected beam, and means which shields the track tangential direction of the optical recording medium having an intensity diameter of the laser beam condensed in the foregoing detecting means by about 30%, respectively, from both sides. The foregoing beam has a wavelength of about 0.78 μm, and the laser beam entering the detecting means which detects the reflected beam reflected from the optical recording medium should have a numerical aperture of up to about 0.08, or more preferably, within a range of from about 0.02 to 0.05, or more preferably, 0.035. A smaller numerical aperture leads to a larger size of the optical head, and a larger numerical aperture makes it difficult to process the width of the shielding mask or the photodiode pattern width and to assemble the optical head.

Since the laser beam is condensed with a spot diameter not meeting the track pitch by using a laser beam having a long wavelength for an optical recording medium provided with an average track pitch substantially equal to, or narrower than, the laser beam wavelength, it is impossible to record information, whereas playback is made possible by employing the foregoing shielding means. Further, for a CD-R, processing such as recording or playback is possible by means of a laser beam having a long wavelength meeting the wavelength selectivity of the dye used therein. For a high-density optical recording medium such as a DVD as well as for an optical recording medium such as a CD-R provided with a dye-based recording layer, a compatible optical head can be provided.

For the foregoing high-density optical recording medium (optical disk) such as a DVD, a substrate having a thickness of about 0.6 mm is usually adopted. When regenerating an optical disk of such a high-density recording medium, the numerical aperture of the objective lens used for the optical head is up to about 0.6, because the coma increases in proportion to the cube of the numerical aperture. On the other hand, a coma is inversely proportional to the laser beam wavelength. In the present invention, in which there is used a laser beam having a wavelength substantially equal to the average track pitch of the optical recording medium, i.e., a wavelength longer than the present DVD standard described above, even a numerical aperture of the objective lens of more than 0.6 permits prevention of the increase in coma. Therefore, it is possible to achieve a smaller optical spot relative to the optical recording medium, and thus to provide an optical head permitting optical recording and regeneration at a higher density.

For example, when adopting a laser beam having a wavelength of about 0.78 μm as specified in the current CD standard, an increase in coma can be prevented even by adopting an objective lens having a numerical aperture of about 0.64. It is therefore possible to achieve a further smaller optical spot caused by an optical super-resolution phenomenon produced by the optical intensity distribution converting means, and to further improve recording density. It is also possible to reduce the role of the optical intensity distribution converting means for achieving a smaller spot diameter and to reduce the size of the side lobe. When utilizing a super-resolution phenomenon based on a phase difference, it is possible to achieve a further smaller optical spot, caused by an optical super-resolution phenomenon produced by the optical phase difference imparting means, and to further improve recording density. It is also possible to reduce the role of the optical phase difference imparting means for producing a small spot diameter.

An optical recording apparatus permitting coping in a group with both a high-recording-density DVD and a CD-R having a high wavelength selectivity, by adopting an optical head capable of processing an optical recording medium having a narrow track pitch by the use of a laser beam of such a long wavelength, and conducting at least any one of recording and regeneration by means of a servo mechanism for causing the optical head to follow the recording track of the optical recording medium.

In place of reducing the spot diameter of the laser beam having a long wavelength by the use of the optical head as described above, it is possible to irradiate a beam having a large spot diameter relative to the optical recording medium having a narrowed track pitch, converting the reflected beam into an information signal, and applying a decoding processing to this information signal to play back the information recorded on the individual tracks of a track pitch substantially equal to the laser beam wavelength. The partial response (PR) method of accomplishing decoding while controlling the amount of interference between signals is suitable for such signal processing. In addition, the error ratio of decoded information can further be improved by adopting the PRML method based on a combination of the maximum-likelihood (ML) method of performing decoding with a series of received signals of a finite length as an object and the PR method.

When adopting an optical head provided with optical intensity distribution converting means or optical phase difference imparting means, the signal reflected by the side lobe of the optical spots increased by the optical super-resolution thereof also forms useful information upon performing decoding by the PRML method. More particularly, the signal based on the side lobe becomes effectively available by selecting the PR method which is a suitable method, and can contribute to regeneration of the signal. Further, by accomplishing decoding by the ML method, there is available an optical recording apparatus which permits achievement of a higher recording density in the optical recording medium and further improvement of reliability of recording/regeneration.

As described above, the use of the optical head or the optical recording apparatus of the invention makes it possible to process in a group optical recording media having different properties including a high-density DVD and a CD-R excellent in properties on the longer wavelength side. Further, the optical head and the optical recording apparatus of the invention permit processing such as recording or regeneration onto or from an optical recording medium having a high recording density by the use of a laser beam of a long wavelength, thus bringing about further remarkable effects such as cost reduction and improvement of reliability of the optical head and the optical recording apparatus.

More specifically, a semiconductor laser serving as the laser source has a wavelength of 0.78 μm for a current CD, and 0.65 μm or 0.635 μm for a DVD. Future development of lasers having shorter wavelengths is expected, and development efforts of laser beam output are directed from read-only 5 mW class toward 30 mW or more for recording. As is suggested by the development trend of semiconductor lasers, however, manufacture of a shorter-wavelength one is more difficult than a longer-wavelength one, and manufacture of a higher-output one is more difficult than that of a lower-output one. This difficulty in manufacture directly affects productivity, and hence the cost of parts: a shorter-wavelength semiconductor laser is more expensive than a longer-wavelength semiconductor laser, and further, a higher-output semiconductor laser is more expensive than a lower-output semiconductor laser. Therefore, an optical head and an optical recording apparatus capable of coping with an optical recording medium having a high recording density would be far more expensive than current ones coping with an optical recording medium having a lower recording density. Furthermore, recordable (writable) optical head and optical recording apparatus would inevitably be more expensive than playback (read-only) optical head and optical recording apparatus.

The optical head and the optical recording apparatus of the invention permit in contrast recording/regeneration for an optical recording medium having a high recording density using a semiconductor laser of a long wavelength, thus making it possible to improve the recording density by the use of a semiconductor laser currently mass-produced at a low cost. For example, for a high-recording-density recording medium having a track pitch of 0.74 μm as specified by the DVD standard, high-density recording/regeneration is achievable by the use of a semiconductor laser having a wavelength within a 0.78 μm range as specified in the present CD standard. Semiconductor lasers of the 0.78 μm band are now mass-produced for CD uses at a very high productivity. A semiconductor laser having a wavelength of about 0.65 μm is difficult to manufacture and expensive, and a high-output laser for writing is manufactured at a very low productivity and expensive. The optical head and the optical recording apparatus of the invention thus make it possible to play back a high-density signal by the use of a semiconductor laser having a longer wavelength manufactured at a high productivity, and further, to record a high-density signal by the use of a high-output semiconductor laser of a high productivity.

Because a laser beam can sufficiently be condensed onto a small spot by producing an optical super-resolution phenomenon by adopting an aspherical optical system as the optical intensity distribution converting means, it is possible to provide at a low cost an optical head and an optical recording apparatus not only for playback but also for writing.

When using optical phase difference imparting means, the laser beam can sufficiently be condensed onto a small spot by producing an optical super-resolution phenomenon through provision of an optical path difference in a part of the optical path serving as the optical phase difference imparting means. It is thus possible to provide an optical head and an optical recording apparatus not only for regeneration but also for writing at a low cost.

Since the use of a laser beam having a long wavelength permits improvement of objective lens properties such as coma, signal regeneration is possible by the use of a small optical spot by using an easily manufacturable objective lens through the application of an inexpensive long-wavelength semiconductor laser and the conventional lens processing technology.

The optical head and the optical recording apparatus of the invention brings about another advantage of further improving the recording density of recordable or readable information in an optical recording medium through the production of an optical super-resolution phenomenon, an increase in numerical aperture of the objective lens, a partial shielding of the laser beam entering the detecting element, and an incorporation of the decoding element based on the PRML method. It is also possible to improve the resolution of signals in recording or regeneration, and therefore to largely improve the performance and reliability of the optical head and the optical recording apparatus. The invention can thus provide an optical head and an optical recording apparatus which uses a long-wavelength laser beam, are capable of coping with a high recording density at a low cost, and have a high reliability.

With a view to achieving an optical head and an optical recording apparatus using a long-wavelength laser beam and coping with a narrow track pitch, progress of the optical super-resolution phenomenon would reduce the utilization efficiency of the laser beam as a result of an increase in the side lobe; the increase in the objective lens numerical aperture would degrade the inclination property (occurrence of an aberration resulting from the inclination of the recording medium relative to the optical axis), thus causing an increase in coma, leading to a higher cost of the objective lens; and excessive dependence upon the decoding process by the PRML method causes an increase in the scale of the signal processing circuit. Under the present circumstances, therefore, when considering the load on the optical intensity distribution converting means or the optical phase difference imparting means, the objective lens and the signal processing circuit, the ratio $\lambda/Tr$ of the laser wavelength $\lambda$ to the track pitch Tr should be up to about 1.2, or more preferably, up to about 1.1.

The invention permits, as described above, achievement of an optical head and an optical recording apparatus which have a wavelength-dependent playback property or writing property, ensure compatibility with a conventional optical recording medium difficult to use with a short wavelength, permit use of a semiconductor laser having a long wavelength relative to the track pitch as compared with the conventional practice, overcome the limit on efforts toward a higher density, and allow reduction of parts costs, inexpensive, and writable. These optical head and optical recording apparatus can also cope with future techniques of a higher density.

BRIEF DESCRIPTION OF THE DRAWINGS

FIGS. 2(A)–(B) are graphs illustrating an intensity distribution of a laser beam emitted from a semiconductor laser in the optical head shown in FIG. 1;

FIGS. 3(A)–(B) are graphs illustrating conversion of an optical intensity distribution by a cover plate in the optical head shown in FIG. 1;

FIGS. 4(A)–(B) are graphs illustrating an optical intensity distribution of a spot condensed with an optical super-resolution phenomenon in the optical head shown in FIG. 1;

FIGS. 23(A)–(B) illustrate a laser beam at a shielding slit of the optical head shown in FIG. 22;

FIGS. 25(A)–(B) illustrate a laser beam at another shielding slit of the optical head shown in FIG. 22; and FIGS. 26(A)–(B) illustrate a laser beam at another photodiode when mounting the photodiode having the side lobe shielding function on the optical head shown in FIG. 10.

DESCRIPTION OF THE PREFERRED EMBODIMENTS

Now, the invention will further be described by means of embodiments of the invention with reference to the drawings.

First Embodiment

Figure 1:
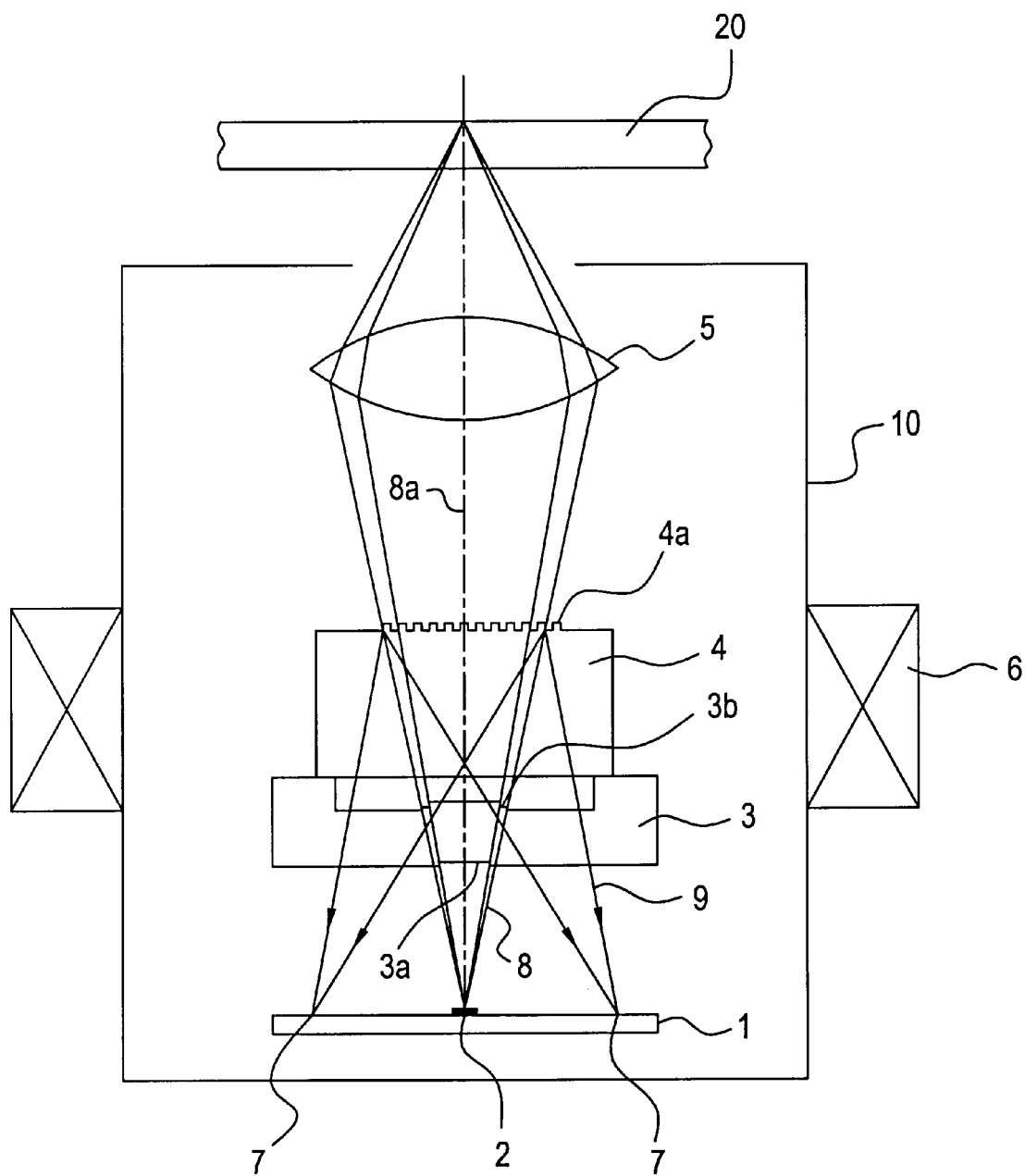
FIG. 1 illustrates a configuration of an optical head of a first embodiment of the invention.

FIG. 1 illustrates a typical configuration of the optical head of the invention. The optical head 10 of this embodiment has a semiconductor laser 2 provided substantially at the center of a semiconductor substrate 1, a plurality of photodiodes 7 provided around the semiconductor substrate 1 with the semiconductor laser 2 as the center, a cover plate 3 serving as optical intensity distribution converting means composed of two aspherical surfaces 3a and 3b, a hologram element 4 having a hologram pattern 4a for signal separation for separating a reflected beam formed thereon, and an objective lens 5 condensing the laser beam. The whole optical head 10 can conduct focusing or tracking control relative to an optical disk 20 by means of a magnetic actuator 6.

The semiconductor laser 2 of the optical head 10 of the first embodiment is a near-infrared semiconductor laser having a wavelength of 0.78 μm. The optical intensity distribution of a laser beam 8 emitted from this semiconductor laser 2 is converted by the cover plate 3 serving as the optical intensity distribution converting means, and the beam enters the objective lens 5. The laser beam 8 is condensed by the objective lens 5 so as to produce an optical super-resolution phenomenon on the recording surface of an optical disk 20. A reflected beam 9 reflected from the optical disk 20 passes through an inverse optical path and is separated in a direction of photodiodes by the hologram pattern 4a for signal separation and condensed in the individual photodiodes 7. Intensity of the reflected beam is converted into an electric signal.

From among the two aspherical surfaces 3a and 3b provided on the cover plate 3 of the embodiment, the first surface 3a has a flat center and a periphery, and the middle portion between the center and periphery portions forms a slow concave surface relative to the entering laser beam 8. Therefore, the laser beam having entered this surface is refracted in the same manner as for a usual flat surface near the center of the optical axis 8a thereof and near the periphery and advances through the cover plate. The laser beam having entered the middle portion is refracted, on the other hand, so as to be dispersed outside, under the effect of the concave lens.

Then, the second surface 3b of the cover plate 3 is flat at the center near the optical axis 8a and at the periphery thereof, and the middle portion therebetween forms a slow convex surface relative to the entering laser beam. In this second surface 3b, the laser beam entering near the center and near the periphery is refracted in the same manner as in an ordinary flat surface and then emitted. On the other hand, for the laser beam entering the middle portion, the emitting angle of the beam is corrected under the convex lens effect.

Of the laser beam penetrating the cover plate in this embodiment, therefore, the laser beam having entered the middle portion of the first surface 3a is scattered toward the periphery, and upon arrival at the second surface 3b, is corrected by the middle portion of the second surface 3b so as to be emitted at the same angle as that of the laser beam having penetrated an ordinary flat surface. Consequently, the laser beam having entered the middle portion of the first surface 3a changes the position thereof closer to the periphery at the position of the second surface 3b, whereas the optical intensity of the laser beam near the center and the outermost periphery does not vary. Under the effect of the cover plate 3 in this embodiment, therefore, the distribution of the laser beam density, i.e., optical intensity is converted so that the optical intensity at the center decreases, and the optical intensity on the outer periphery increases. The laser beam refracted by the second surface 3b is angularly corrected so that the wave surface forms substantially a spherical surface, and further, the optical intensity distribution on the incident pupil relative to the objective lens 5 is converted without suffering a loss of the optical amount. It is therefore possible to produce an optical super-resolution phenomenon without losing the optical amount of the laser beam emitted from the semiconductor laser 2 and form a small spot on the optical disk 20.

FIGS. 2(A) to 4(B) illustrate the process in which the laser beam 8 emitted from the semiconductor laser 2 penetrates the cover plate 3, produces an optical super-resolution phenomenon by means of the objective lens 5, and is condensed onto the optical disk 20. Because the semiconductor laser 2 is provided with an elliptic radiation property, the intensity distribution of the laser beam 8 emitted from the semiconductor laser 2 does not form a rotational symmetry, but varies with the radiating direction of the semiconductor laser. For example, as shown in FIGS. 2(A)–(B), the emitted laser beam having a wide distribution Q1 of optical intensity in a direction at right angles to the paper plane of FIG. 1 and a narrow distribution Q2 of optical intensity in a direction parallel therewith.

When the laser beam having such distributions Q1 and Q2 passes through the cover plate 3 serving as the optical intensity distribution converting means, the intensity distribution is converted into Q1' and Q2' as shown in FIGS. 3(A)–(B). More particularly, since the component at the center near the optical axis 8a is transferred by the cover plate 3 to the peripheral portion, the distribution Q1 of the vertical component of the laser beam is converted into a distribution Q1' concave at the center relative to the periphery as shown in FIG. 3(A). The distribution Q2 of the parallel component of the laser beam is converted, as shown in FIG. 3(B), into a distribution Q2' having a reduced center portion and an increased peripheral portion.

When the laser beam having the distribution converted so as to have a higher optical intensity at the periphery than at the center is condensed by the objective lens 5, there are available distributions Q1" and Q2" in which an optical super-resolution phenomenon is remarkable as shown in FIGS. 4(A)–(B). When converting the optical intensity distribution of the laser beam having a wavelength of 0.78 $\mu$m in the present embodiment, so as to achieve a ratio of peripheral optical intensity to the center of about twice as shown in FIG. 3(A), there is available a small spot having an optical spot diameter of up to 0.9 to 1 $\mu$m (diameter of intensity of $1/e^2$) as condensed onto the optical disk 20, and as compared with the conventional spot diameter of about 1.2 $\mu$m, the diameter of the spot of condensation onto the optical disk can be reduced to 80% or less. Particularly, for the vertical direction component as shown in FIG. 4(A), a narrow peak is available as represented by a $1/e^2$ intensity of up to 0.9 $\mu$m. Side lobes 30 appearing on both sides of the main lobe 31 at the center contain larger vertical components in which the optical super-resolution phenomenon is more remarkable. In this embodiment, therefore, the direction in which such larger side lobes appear is aligned with the tangential direction of the optical disk to obtain signals regarding information recorded in the optical disk also from the side lobes so as to obtain a larger space frequency.

A spot having a diameter of 1 $\mu$m or less can be formed on the optical disk 20 by means of the optical head 10 of this embodiment, and this spot diameter is substantially equal to the spot diameter resulting from condensation of a laser beam having a wavelength of 0.65 $\mu$m or 0.63 $\mu$m as specified by the DVD standard corresponding to the foregoing high recording density through an objective lens having a numerical aperture of 0.6 onto the optical disk. Therefore, by means of the laser beam of the spot diameter formed by the use of the optical head 10 of the present embodiment, it is possible to accomplish processing such as recording or regeneration onto or from a phase variable type optical disk or the like having an average track pitch of 0.74 $\mu$m corresponding to that specified by the DVD standard.

Figure 5:
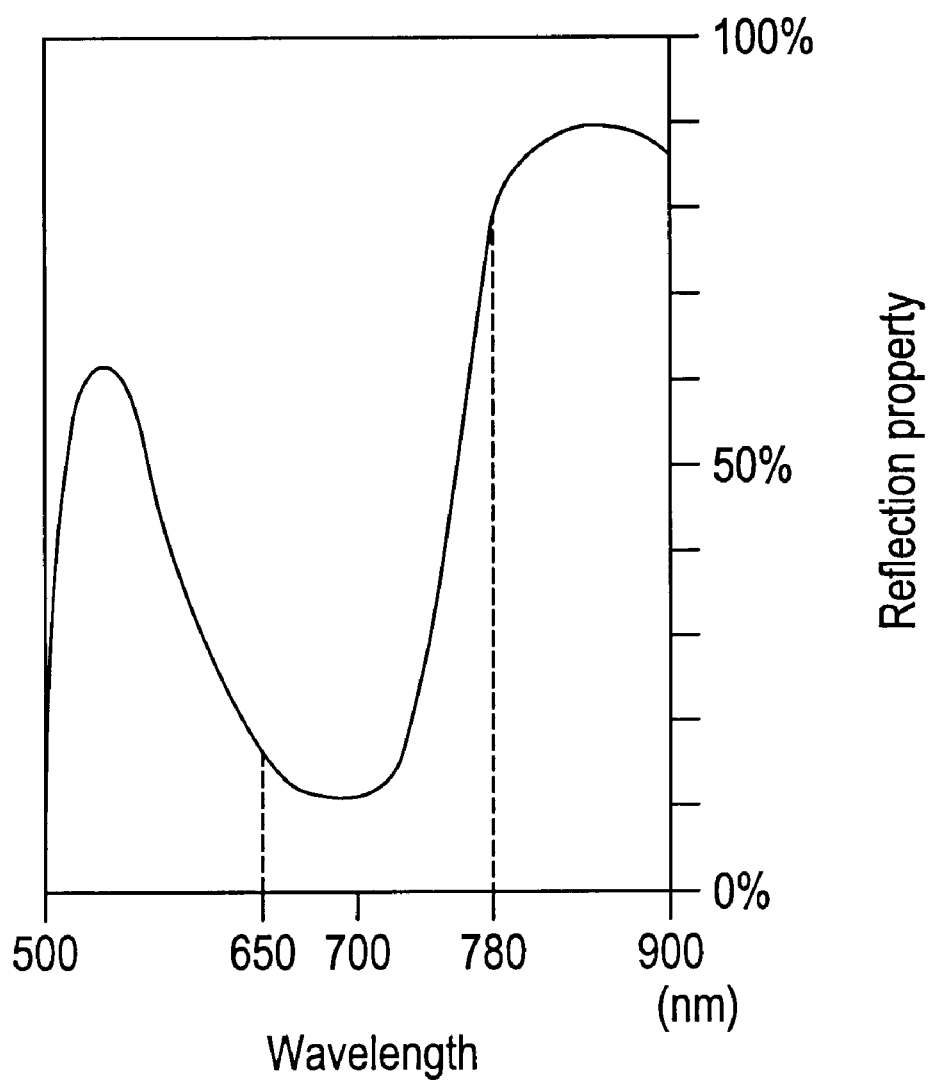
FIG. 5 is a graph illustrating reflecting property of a CD-R relative to the wavelength of a laser beam.

Further, processing such as recording or regeneration is possible for a CD-R using a dye-based recording layer by the use of the optical head 10 of this embodiment. FIG. 5 illustrates the reflection property of the CD-R relative to the wavelength of the laser beam. As is known from FIG. 5, while a CD-R exhibits a very high reflection property for a wavelength near 0.8 $\mu$m, reflectivity is very low for a wavelength of 0.6 to 0.7 $\mu$m. As a result, processing such as regeneration or recording is impossible with the use of a laser beam having a wavelength of 0.65 $\mu$m or 0.63 $\mu$m as corresponding to the DVD standard. In contrast, with the optical head 10 of the present embodiment, which uses a laser beam having a wavelength of 0.78 $\mu$m, it is possible to process a CD-R in a region in which an excellent reflection property is available. Therefore, by the use of the optical head 10 of this embodiment, it is possible to achieve an optical recording apparatus capable of processing in a group an optical disk of a high recording density of the DVD standard and an optical disk provided with a dye-based recording layer such as a CD-R. Playback of an optical disk of the conventional CD standard (CD) is of course possible. According to the present invention, as described above, it is possible to achieve an optical head capable of accomplishing processing such as recording or regeneration onto or from an optical disk of a high recording density having an average track pitch of about 0.74 $\mu$m (including a deviation of about ±4%) by means of a laser beam having a wavelength of 0.78 $\mu$m (including a deviation of about ±4% in an ordinary semiconductor laser). Further, it is possible to provide an optical head compatible also with an optical recording medium such as a CD-R, which cannot be processed under the conventional DVD standard.

In the optical head 10 of the present embodiment, conversion is effected so that the laser beam intensity is about twice as high at the periphery as that at the center as shown in FIG. 3(A). It is of course possible to increase the intensity further to about 1.5 to 3.5 times as high at the periphery, and to achieve a higher-density recording by forming a further smaller-diameter spot on the optical disk. However because a higher intensity at the periphery leads to a higher intensity of the side lobe 30, and to a lower intensity of the main lobe 31 at the center, resolution of the beam reflected from the optical disk may deteriorate. Therefore, the ratio of optical intensity at the periphery to that at the center should preferably be up to three times, and further, a ratio of about twice as in the present embodiment permits inhibition of the intensity of the side lobe to about 10 to 15% of that of the main lobe. By adopting an optical system not completely shielding the laser beam at the center portion and not nullifying the laser beam intensity at the center as the optical intensity distribution converting means as in the present embodiment, the side lobe intensity can be inhibited to about a half with a constant spot diameter, as compared with the case where means shielding the laser beam at the center is adopted.

Figure 6A:
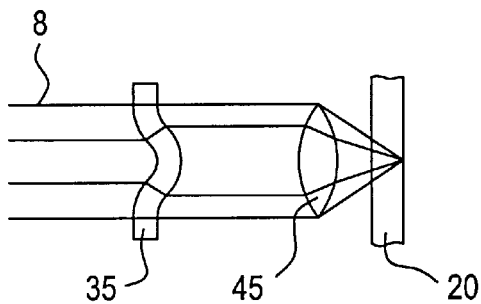
FIGS. 6(A)–(B) illustrate conversion of an optical intensity distribution using an aspherical optical system of an infinite system.
Figure 6B:
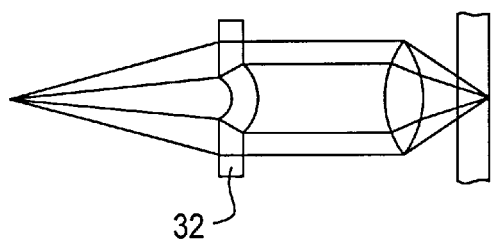
Figure 7A:
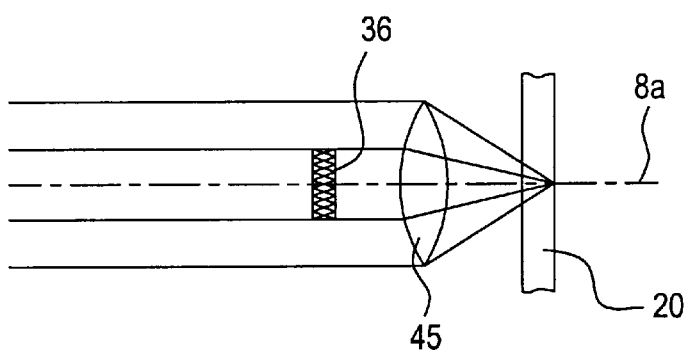
FIGS. 7(A)–(B) illustrate conversion of an optical intensity distribution using a mask plate.
Figure 7B:
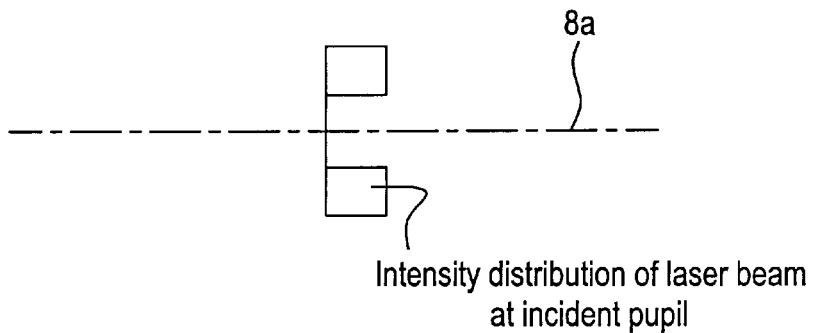
Figure 8A:
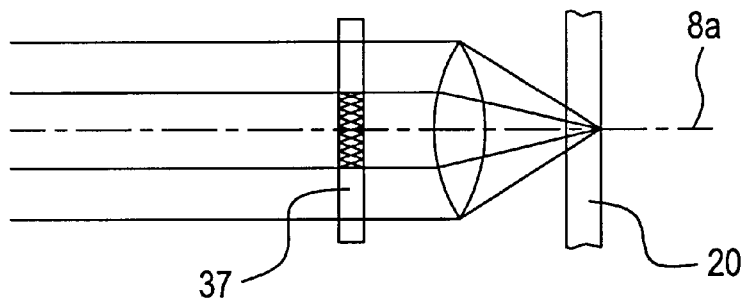
FIGS. 8(A)–(B) illustrate conversion of an optical intensity distribution using a filter.
Figure 8B:
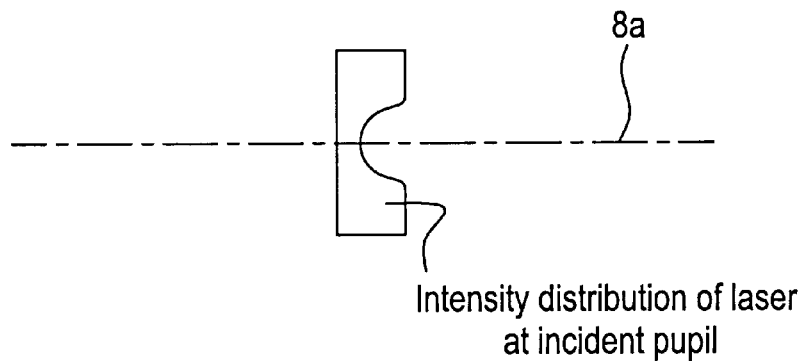

In the optical head 10 of this embodiment, furthermore, a finite type aspherical optical system is adopted in the form of a cover plate provided with two aspherical surfaces 3a and 3b with a view to converting the optical intensity distribution of the laser beam emitted from the semiconductor laser. The conversion in the invention is not however limited to this, but as shown in FIG. 6(A) for example, the optical intensity distribution may be converted by the use of an infinite type aspherical element 35 relative to the laser beam held in parallel by a collimator lens or the like. Also as shown in FIG. 6(B), a collimator lens 32 having an optical intensity distribution converting function may be used. By converting the laser beam intensity distribution by the use of the aspherical element 3 or 35, it is possible to prevent a loss of laser beam at the optical intensity distribution converting means and form a high-energy spot on the optical disk. The optical head of the embodiment is therefore suitable particularly for a writable optical head or optical recording apparatus requiring a very high optical output. When adopting the finite type aspherical optical element of this embodiment, the relative positional relationship between the semiconductor laser 2 and the cover plate 3 should preferably be fixed so as to prevent the occurrence of an off-axis aberration A mask plate 36 as shown in FIGS. 7(A)–(B) may also be employed as optical intensity distribution converting means, although there would be a tendency toward a slight increase of the side lobes. In the example shown in FIGS. 7(A)–(B), it is possible to reduce the optical intensity at the center portion and hence relatively increase the optical at the periphery by providing the mask plate 36 so as to shield the center portion on the incident pupil of the objective lens. Therefore, a remarkable optical super-resolution phenomenon can be produced by the objective lens 45, and a small-diameter spot can be formed. Further, as shown in FIGS. 8(A)–(B), it is possible to produce a remarkable optical super-resolution phenomenon by using a filter 37 having a small transmissivity at the center as optical intensity distribution converting means. When using such a mask plate 36 or a filter 37, the cost is low although the laser beam is slightly lost, and this method is suitable particularly for a read-only optical head or an optical recording apparatus.

Further, in the optical head 10 of this embodiment, a higher-resolution signal is available by adopting a larger numerical aperture of the objective lens 5 than that specified in the current DVD standard, and it is thus possible to conduct recording or regeneration at a higher density onto or from an optical disk. In a high-recording-density optical disk, a disk substrate having a thickness of about 0.6 mm which is smaller than that set forth in the current CD standard to improve the inclination property is adopted. When playing back this optical disk, coma increases in proportion to the cube of the numerical aperture, and decreases in inverse proportion to the wavelength of the laser beam. As a result, in the current DVD standard, the upper limit of numerical aperture of the objective lens is about 0.6 for a laser beam having a wavelength of 0.63 $\mu$m or 0.65 $\mu$m. In the optical head 10 of this embodiment, however, a high-recording-density optical disk of the DVD standard can be coped with by the use of a laser beam having a wavelength of 0.78 $\mu$m. It is therefore possible to increase the numerical aperture of the objective lens to about 0.64 (including an error of about ±4%) without improving the performance of the lens relative to coma. A smaller spot is therefore available without increasing the objective lens performance, and it is possible to provide an optical head capable of performing optical recording and regeneration at a higher density. In addition, because it is possible to reduce the load on the optical intensity distribution converting means such as a cover plate to obtain a spot diameter corresponding to an optical disk of the DVD standard, it is possible to provide an optical head having a high resolution of signals, capable of reducing the intensity of the side lobes.

Figure 9:
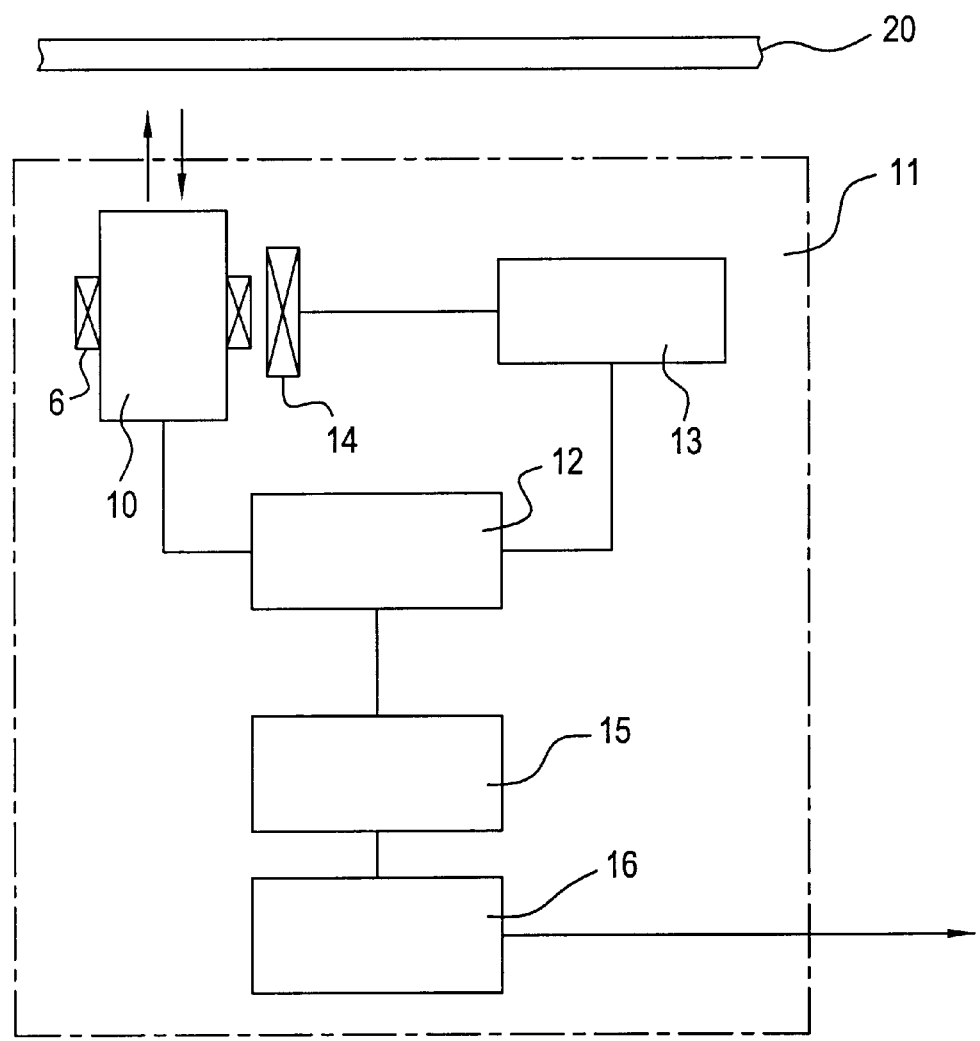
FIG. 9 illustrates a schematic configuration of an optical recording apparatus using the optical head shown in FIG. 1.

FIG. 9 illustrates a schematic configuration of an optical recording apparatus 11 using the optical head 10 of this embodiment. The optical recording apparatus 11 of this embodiment comprises an RF amplifier 12 which generates servo signals such as a focus error signal and a tracking error signal from signals by means of the photodiodes of the optical head 10, and further has a function of generating an RF signal, a servo control circuit 13 which controls focusing and tracking of the optical head 10 on the basis of servo signals, and an actuator 14 controlled by the servo control circuit 13. An RF signal provided by the RF amplifier 12 as an output is entered into a PRML circuit 15 and subjected to decoding by the application of the partial response (PR) method and the maximum-likelihood (ML) method. As the weighting coefficient of PR, PR(1,1) or PR(1,2,1) is selected in consideration of the modulating method with the optical spot and required performance. Data read out from the optical disk 20 is put out to an external computer or the like through a processing circuit 16 provided with functions such as a digital filter.

The PRML method based on a combination of the partial response (PR) method for decoding through control of the amount of interference between signals and the maximum-likelihood (ML) method for decoding finite length received signals is a known technique in the area of waveform transmission technology for digital transmission. In the present embodiment, this technique is applied for decoding separated signals in an optical disk having a narrowed track pitch. By conducting decoding by the application of the PRML method, it is possible to separate signals available from an optical disk of a narrow track pitch and decode the information even when using an optical head of a long wavelength using a high-NA objective lens giving a spot diameter of about 1.2 $\mu$m, in place of the optical head of the present embodiment. In an optical recording apparatus provided with a PRML circuit, therefore, it is possible to decode data from an optical disk of the DVD standard by using an optical head leading to a large spot diameter by means of a laser beam of a long wavelength for a current CD, and at the same time, to process a CD-R by the use of a long-wavelength laser beam.

In the optical recording apparatus of this embodiment, furthermore, it is also possible to decode by the PRML method even a signal formed by the reflection of the side lobes of the optical spot increased by the optical super-resolution phenomenon, by adopting an optical head 10 provided with optical intensity distribution converting means. This permits regeneration processing with a higher reliability, thus further improving the recording density in the optical disk.

In the optical head and the optical recording apparatus of this embodiment, as described above, it is possible to process in a group optical disks of different properties such as a high-density DVD and a CD-R excellent in properties on the longer wavelength side, and further, processing such as recording or regeneration is possible onto or from a high-recording-density optical disk of the DVD standard by the use of a semiconductor laser of the current CD standard. An optical recording medium having a higher recording density can be coped with by a combination of an optical super-resolution phenomenon, an objective lens having a large numerical aperture and the PRML method. It is therefore possible to provide an optical head and an optical recording apparatus capable of coping with the future tendency toward a higher recording density by the use of a semiconductor laser which is inexpensive, already in common use and has a high reliability. Since the laser beam emitted from the semiconductor laser can be condensed into a small-diameter spot without reducing the optical intensity of the laser beam by using an aspherical optical system, a spot having an energy sufficient to allow writing into the optical disk can be formed. There are therefore available an optical head and an optical recording apparatus which permit not only regeneration of a high-density record but also recording (writing) by the use of an inexpensive long-wavelength laser beam having a high reliability.

The cases based on an optical disk and a semiconductor laser in conformity to specifications of the current CD standard and the DVD standard have been described above. It is however needless to mention that the present invention is not limited to those of the above specifications. By the full utilization of an optical super-resolution phenomenon, an objective lens having a large numerical aperture and the PRML method, it is possible to provide an optical head or an optical recording apparatus which permit recording and regeneration at a high density onto or from an optical disk having a track pitch substantially equal to, or narrower than, the wavelength of a long-wavelength laser beam used.

When utilizing a combination of an optical super-resolution phenomenon, an objective lens having a large numerical aperture and the PRML method, it is desirable to take account of the facts that progress of the optical super-resolution phenomenon causes an increase of side lobes, thus reducing the utilization efficiency of the laser beam, that the increase in the numerical aperture of the objective lens causes degradation of the inclination property and an increase in coma, thus increasing the cost of the objective lens, and that an excessive dependence on decoding by the PRML method results in an increase in the scale of the signal processing circuit. Therefore, under the present circumstances, the ratio $\lambda/Tr$ of the laser wavelength $\lambda$ to the track pitch Tr should preferably be up to 1.2, or more preferably, about 1.1, in consideration of feasible design values of the optical intensity distribution converting means, the objective lens and the signal processing circuit.

Second Embodiment

Figure 10:
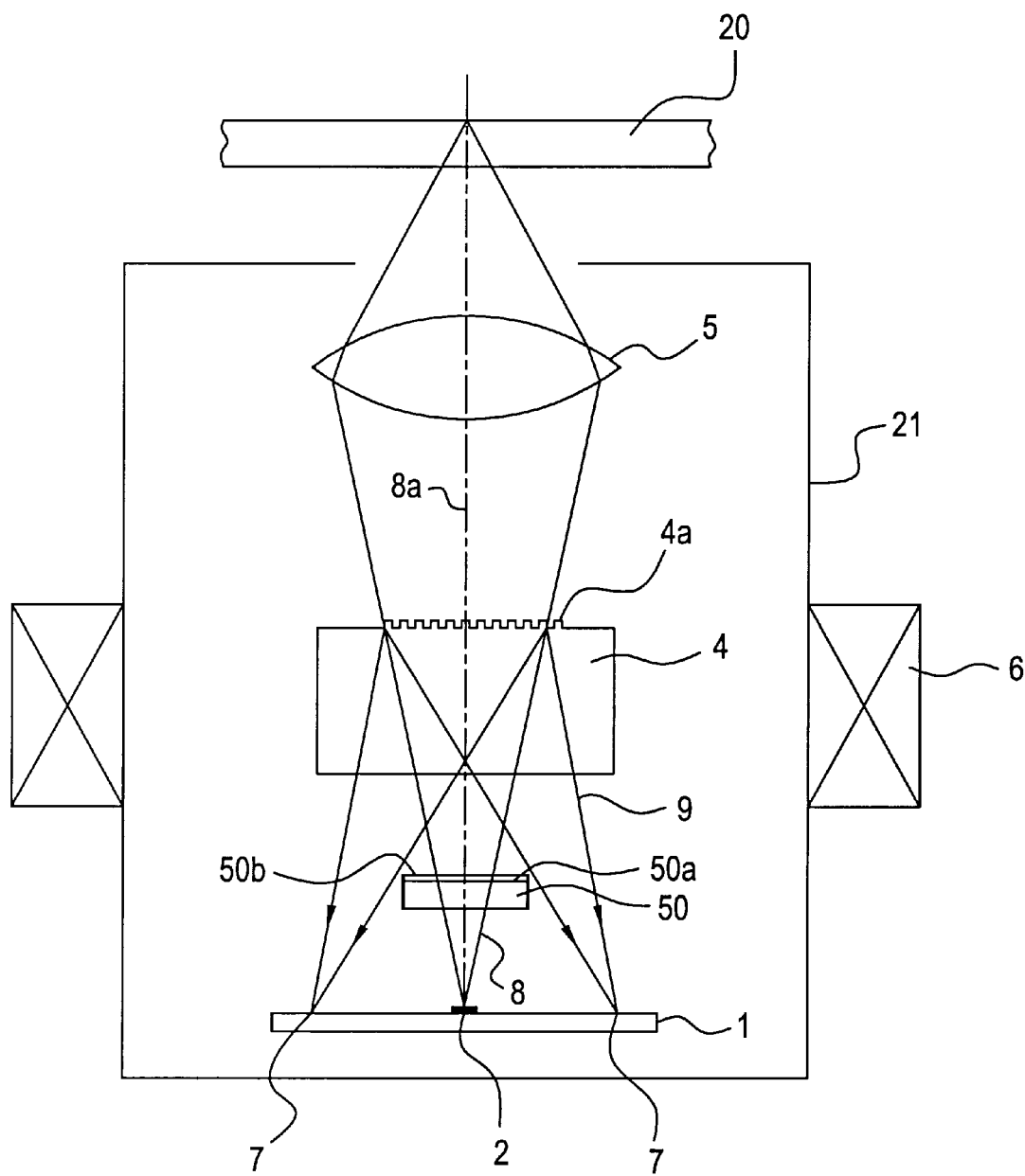
FIG. 10 is a diagram illustrating a configuration of an optical head of a second embodiment of the present invention.

FIG. 10 illustrates a second embodiment of the optical head of the invention. The optical head 21 of this embodiment has a semiconductor laser 2 provided substantially at the center of a semiconductor substrate 1, a plurality of photodiodes 7 provided around the semiconductor substrate 1 with the semiconductor laser 2 as the center, a hologram element 4 having a hologram pattern 4a for signal separation for separating a reflected beam formed thereon, a phase variable filter 50 serving as optical phase difference imparting means composed by providing concave and convex portions on a substrate having a uniform refractive index, and an objective lens 5 condensing the laser beam. The whole optical head 11 can conduct focusing or tracking control relative to an optical disk 20 by means of a magnetic actuator 6.

The semiconductor laser 2 of the optical head 21 of the second embodiment is a near-infrared semiconductor laser having a wavelength of 0.78 $\mu$m. The optical intensity distribution of a laser beam 8 emitted from this semiconductor laser 2 is imparted with a phase difference by a phase variable filter 50 serving as the optical phase difference imparting means, and the beam enters the objective lens 5. The laser beam 8 is condensed by the objective lens 5 so as to produce an optical super-resolution phenomenon on the recording surface of an optical disk 20. A reflected beam reflected from the optical disk 20 passes through an inverse optical path and is separated in a direction of photodiodes 7 by the hologram pattern 4a for signal separation and condensed in the individual photodiodes 7. Intensity of the reflected beam is converted into an electric signal for output.

Figure 11A:
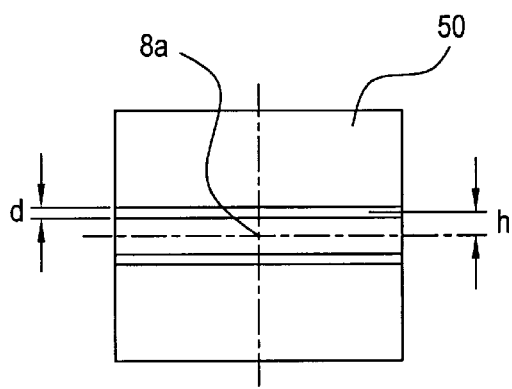
FIGS. 11(A)–(C) are diagrams illustrating a shape of a phase variable filter.
Figure 11B:
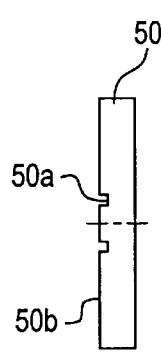

FIGS. 11(A)–(B) illustrate details of the phase variable filter 50. FIG. 11(A) is a front view and FIG. 11(B) is a side view. In the phase variable filter 50 of this embodiment, two strip-shaped recesses 50a are formed in a uniaxial direction (right-to-left direction in FIG. 11(A)), vertically symmetrically in FIG. 11(A) relative to the optical axis center 8a of the laser beam. The recess 50a is for imparting a phase difference and is designed so that the phase of the laser beam passing through the concave portion (recess 50a) is in delay by 180° (–$\pi$ radian) as compared with the phase of the laser beam passing through the non-concave portion (flat portion 50b). A phase difference is imparted to a portion of the laser beam entering the objective lens by providing this strip-shaped recess, thereby producing an optical super-resolution phenomenon, and forming a small spot on the optical disk 20.

Figure 12A:
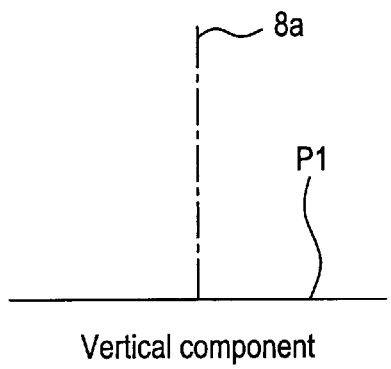
FIGS. 12(A)–(B) are graphs illustrating a phase difference distribution of a laser beam emitted from a semiconductor laser in the optical head shown in FIG. 10.
Figure 12B:
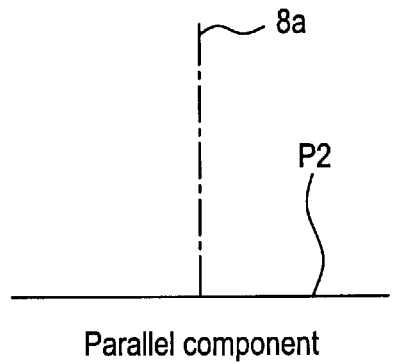

FIGS. 12(A) to 14(B) illustrate the state in which the laser beam 8 emitted from the semiconductor laser 2 passes through the phase variable filter 50, the objective lens 45 causing an occurrence of an optical super-resolution phenomenon, and is condensed onto the optical disk 20. As the semiconductor laser 2 has an elliptic irradiation property as shown in FIGS. 2(A)–(B), the intensity distribution of the laser beam 8 emitted from the semiconductor laser 2 does not form a rotational symmetry, but varies with the irradiating direction of the semiconductor laser. More specifically, for example, there is emitted a laser beam having a wide optical intensity distribution Q1 in a direction at right angles to the paper plane of FIGS. 11(A)–(B) and a narrow optical intensity distribution Q2 in the parallel direction. However, the phase property is constant irrespective of the irradiation property of the semiconductor laser: as shown in FIGS. 12(A)–(B), for example, there is emitted a laser beam having a phase difference P1 in the vertical direction to FIGS. 11(A)–(B) and a phase difference P2 in the parallel direction both in a state of 0. When the laser beam having such a phase difference distribution passes through the phase variable filter 50 serving as the optical phase difference imparting means, the phase differences are converted into phase differences P1', P2' and P2" as shown in FIGS. 13(A)–(B). That is, as a result of a delay in phase by 180° of the laser beam passing through the recess 50a, the phase difference P1 of the vertical component of the laser beam is converted into P1', and the phase difference P2 of the parallel component of the laser beam, into P2' in the region not containing the recess 50a and into P2" in the region containing the recess 50a.

Figure 13A:
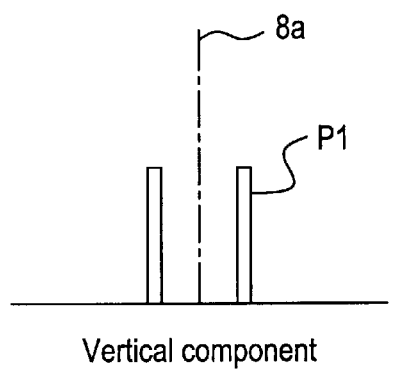
FIGS. 13(A)–(B) are graphs illustrating conversion of an optical phase difference distribution by a phase variable filter in the optical head shown in FIG. 10.
Figure 13B:
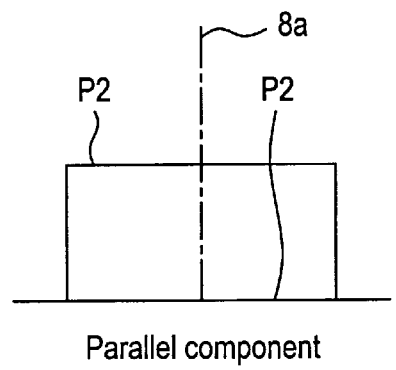
Figure 14A:
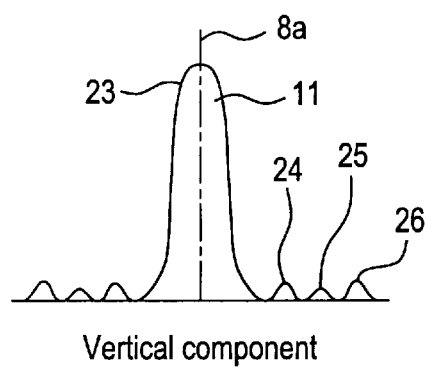
FIGS. 14(A)–(B) are graphs illustrating an optical intensity distribution of a spot condensed with an optical super-resolution phenomenon in the optical head shown in FIG. 10.
Figure 14B:
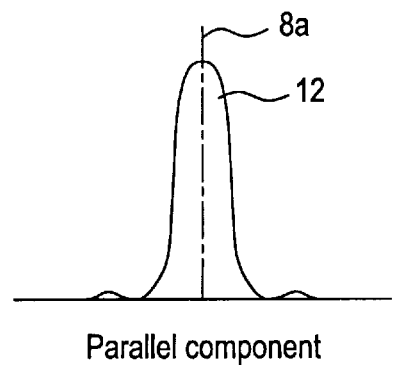

When the laser beam having a phase difference as shown in FIGS. 13(A)–(B) is condensed through the objective lens 5, there is available an optical intensity distribution I1 in which the optical super-resolution phenomenon is remarkable in the vertical direction as shown in FIGS. 14(A)–(B). By changing the width d of the strip-shaped recess 50a, and the distance h between the laser optical axis center and the width d center of the strip-shaped recess 50a, there are caused changes in the optical spot diameter of the laser beam condensed onto the optical disk, and the side lobe intensity of the primary side lobe 24, the secondary side lobe 25, and tertiary side lobe 26, and in some cases, the side lobes of higher orders, appearing on the both sides of the main lobe 23. In the present embodiment, there is available a small-diameter spot having an optical spot diameter of up to 0.9 to 1 μm (diameter at an intensity $1/e^2$) in the vertical direction as condensed onto the optical disk 20, by setting a width d of the strip-shaped recess 50a of about 5% of the effective diameter at the phase variable filter, and a distance h between the laser optical axis center and the width d center of the strip-shaped recess 50a of about 13% of the foregoing effective diameter. As compared with the conventional spot diameter of about 1.2, the diameter of the spot where the beam is condensed onto the optical disk can be reduced to 80% or less. When using the phase variable filter of this embodiment, there is available a narrow peak as represented by a $1/e^2$ intensity of up to 0.9 μm for the vertical component as shown in FIG. 14(A). For the primary side lobe 24, the secondary side lobe 25 and the tertiary side lobe 26 appearing on the both sides of the main lobe 23 at the center, vertical components are larger, and the intensity of each of these side lobes is kept at about 5 to 10% of the main lobe. Almost no super-resolution component however appears in the parallel direction, and the spot diameter and the side lobe intensity are of the same order as those in the case where a phase variable filter is not inserted. In this embodiment, therefore, the direction of appearance of the larger side lobes 24, 25 and 26 is aligned with the tangential direction of the optical disk so that larger space frequencies are obtained by getting signals regarding the information recorded in the optical disk also via side lobes.

Use of the optical head 21 of this embodiment permits formation of a spot having a diameter of 1 μm or less on the optical disk 20, and processing such as regeneration or recording onto or from an optical disk having an average track pitch of 0.74 μm corresponding to the DVD standard and a CD-R using a dye-based recording layer, as well as regeneration of an optical disk under the conventional CD standard (CD).

Figure 11C:
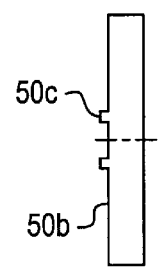

In the optical head 21 of the present embodiment, a phase difference of −180° is imparted to a recess 50a by providing the recess 50a as shown in FIG. 11(B). The same super-resolution effect is available by providing a projection 50c as shown in FIG. 11(C) and imparting a phase difference of +180°. In place of providing a recess 50a or a projection 50b, the same effect is available by changing the refractive index of the substrate material and imparting a phase difference of −18° or +180°.

Figure 15A:
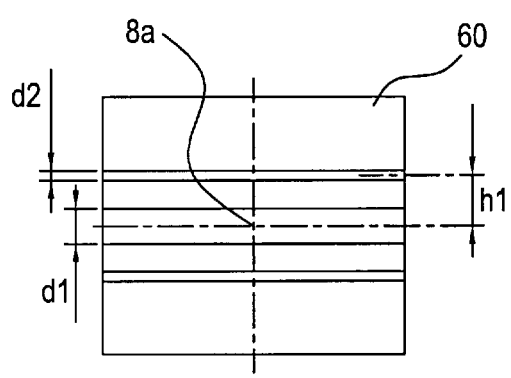
FIGS. 15(A)–(B) illustrate a shape of a second phase variable filter.
Figure 15B:
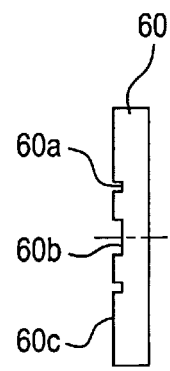

FIGS. 15(A)–(B), 16(A)–(B) and 20(A)–(B) illustrate another embodiment of the phase variable filter. First, in FIGS. 15(A)–(B), FIG. 15(A) is a front view, and FIG. 15(B) is a side view. In the phase variable filter 60 of this embodiment, three long strip-shaped recesses 60a and 60b are formed at vertically symmetrical positions in FIG. 15(A) relative to the optical axis center 8a of the laser beam, in the uniaxial direction (right-to-left direction in FIG. 15(A)). These recesses 60a and 60b are to impart a phase difference and designed so that the phase of the laser beam passing through the concave portion (recesses 60a and 60b) is in delay by 180° from the phase of the laser beam passing through the non-concave portion (flat portion 60c). By providing these strip-shaped recesses, it is possible to impart a phase difference to a part of the laser beam entering the objective lens, produce an optical super-resolution phenomenon, and form a small spot on the optical disk 20.

In this embodiment, the width d1 of the strip-shaped recess 60a and the width d2 of the recess 60b are set at about 3% of the effective diameter at the phase variable filter portion, and the distance h1 between the laser optical axis center and the width d2 center of the strip-shaped recess 60b, at about 28% of the foregoing effective diameter. By inserting the same into the optical head 21 shown in FIG. 10 in place of the phase variable filter 50, there is available a small spot having an optical spot diameter of up to 0.9 to 1 μm (diameter of intensity $1/e^2$) in the vertical direction, as condensed onto the optical disk 20, thus achieving properties equivalent to those of the phase variable filter 50 shown in FIGS. 11(A)–(B).

Figure 16A:
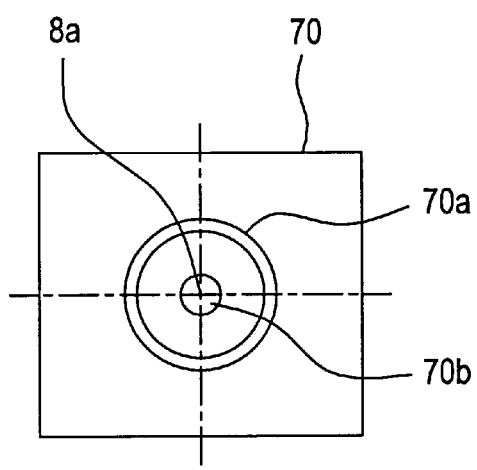
FIGS. 16(A)–(B) illustrate a shape of a third phase variable filter.
Figure 16B:
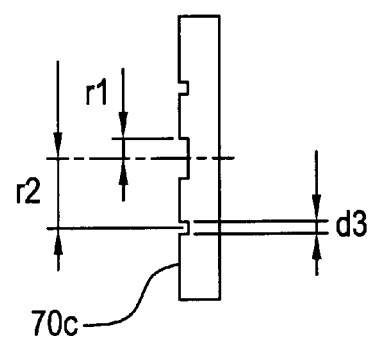

In FIGS. 16(A)–(B) illustrating a phase variable filter, FIG. 16(A) is a front view and FIG. 16(B) is a side view. In the phase variable filter 70 of this embodiment, ring-shaped recesses 70a and 70b are formed at positions around the optical axis center 8a of the laser beam and are designed to impart a phase difference of −180° to the laser beam passing through the recesses 70a and 70b.

Figure 17A:
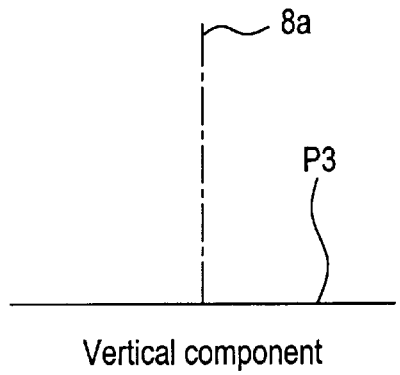
FIGS. 17(A)–(B) are graphs illustrating a phase difference distribution of a laser beam emitted from a semiconductor laser when using the second phase variable filter in the optical head shown in FIG. 10.
Figure 17B:
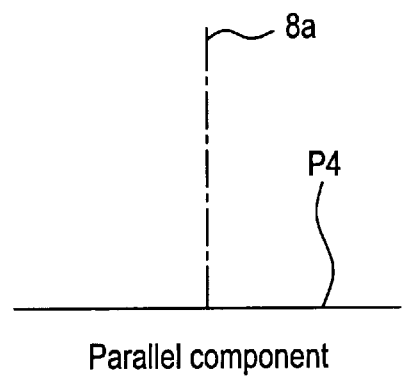
Figure 18A:
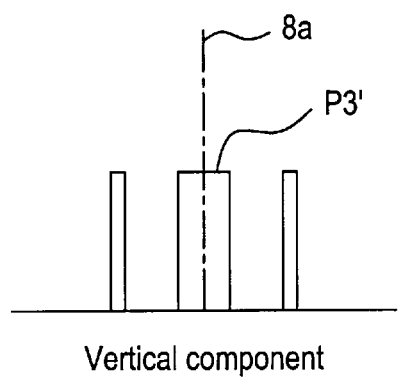
FIGS. 18(A)–(B) are graphs illustrating conversion of an optical phase difference distribution by means of a phase variable filter in the optical head shown in FIG. 10 when the second phase variable filter is inserted.
Figure 18B:
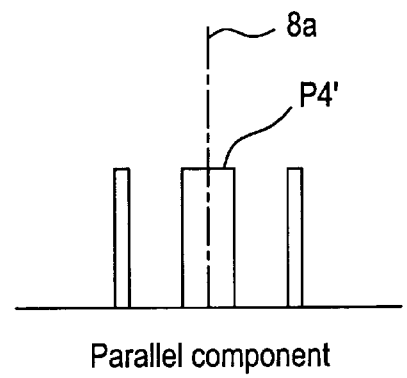
Figure 19A:
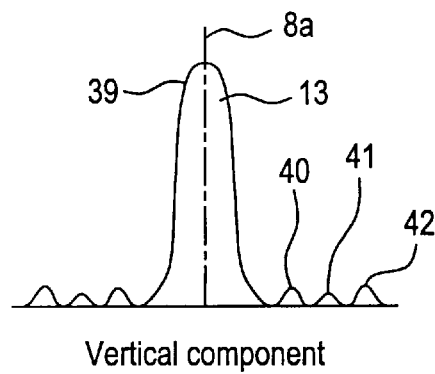
FIGS. 19(A)–(B) are graphs illustrating an optical intensity distribution of a spot condensed with an optical super-resolution phenomenon in the optical head shown in FIG. 10 when the second phase variable filter is inserted.
Figure 19B:
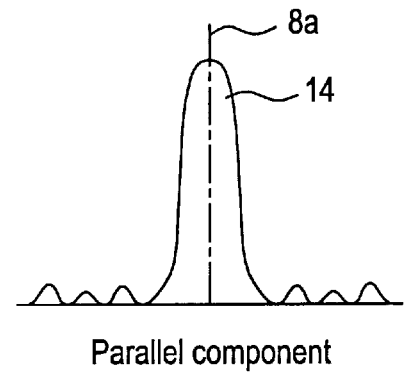

FIGS. 17(A) to 19(B) illustrate the process in which, in a case where a phase variable filter 70 is mounted in place of the phase variable filter 50 on the optical head 21, the laser beam 8 emitted from the semiconductor laser 2 passes through the phase variable filter 70, the objective lens 45 producing an optical super-resolution phenomenon, and is condensed onto the optical disk 20. As shown in FIGS. 17(A)–(B), the phase property of the laser beam emitted from the semiconductor laser is constant irrespective of the irradiation property of the semiconductor laser. For example, there is emitted a laser beam in which a phase difference P3 in a direction at right angles to the paper plane of FIGS. 11(A)–(B) of the optical head shown therein and a phase difference P4 in the parallel direction are both in the state of 0. When the laser beam having the phase difference distribution as described above passes through the phase variable filter 70 serving as the optical phase difference imparting means, these phases are converted into phase differences P3' and P4' as shown in FIGS. 18(A)–(B). When the laser beam having the phase differences as shown in FIG. 18 is condensed through the objective lens 45, there is available optical intensity distributions 23 and I4 in which an optical super-resolution phenomenon is remarkable both in the vertical direction and in the parallel direction as shown in FIGS. 19(A)–(B).

By changing the width d3 of a ring-shaped recess 70a shown in FIGS. 16(A)–(B), the radius r1 of the recess 70b at the laser beam center, and the distance r2 between the laser beam center 8a and the ring-shaped recess 70a, there are changes in the optical spot diameter of the laser beam condensed on the optical disk and the intensity of the primary side lobe 40, the secondary side lobe 41, and the tertiary side lobe 42, and in some cases, side lobes of higher orders, appearing on both sides of the main lobe 39. In the present embodiment, there is available a small-diameter spot having an optical spot diameter of up to 0.9 to 1 μm (diameter at an intensity $1/e^2$) in the vertical direction as condensed onto the optical disk 20, by setting a width d3 of the ring-shaped recess 70a of about 5% of the effective diameter at the phase variable filter, a radius r1 of the laser beam center recess 70b of about 10% of the foregoing effective diameter, and a distance r2 between the laser optical center 8a and the ring-shaped recess 70a of about 65% of the foregoing effective diameter. For the primary side lobe 40, the secondary side lobe 41, and the tertiary side lobe 42 appearing on both sides of the main lobe 39 at the center, the intensity of each of these side lobes is kept at about 5 to 10% of the main lobe. The phase variable filter 60 differs from the phase variable filter 50 in that a remarkable optical super-resolution phenomenon occurs also in the parallel direction, leading to an increase in side lobes in the parallel direction.

Figure 20A:
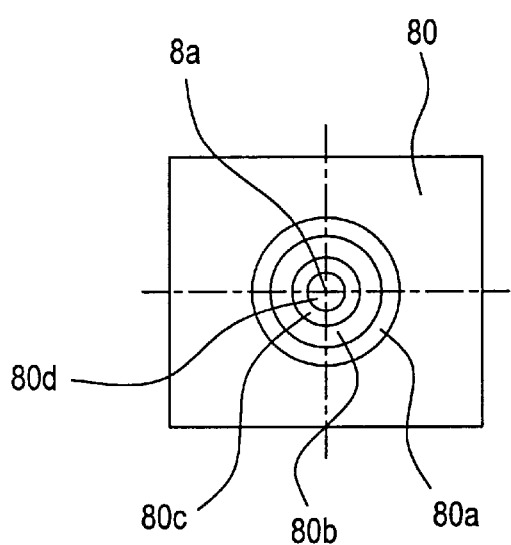
FIGS. 20(A)–(B) are diagrams illustrating a shape of a fourth phase variable filter.
Figure 20B:
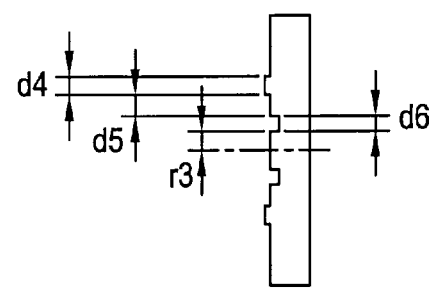

Then, in the phase variable filter shown in FIGS. 20(A)–(B), FIG. 20(A) is a front view, and FIG. 20(B) is a side view. The phase variable filter 80 of this embodiment is designed so as to reduce the side lobe intensity, in which a ring-shaped projection 80a and ring-shaped recesses 80b and 80c are formed at positions around the optical axis center 8a of the laser beam, and is designed to impart phase differences of about $-90°$, $50°$ and $290°$, respectively, to the laser beams passing through the projection 80a, and the recesses 80b and 80c. There is available a small-diameter spot having an optical spot diameter of up to 0.9 to 1 $\mu$m (diameter at an intensity $1/e^2$) in the vertical direction as condensed onto the optical disk 20, by setting a width d4 of the ring-shaped projection 80a of about 9% of the effective diameter at the phase variable filter, a width d5 of the ring-shaped recess 80b of about 11% of the effective diameter at the phase variable filter, a width d6 of the ring-shaped recess 80c of about 8% of the effective diameter at the phase variable filter, and a radius r3 of the flat portion of about 10% of the foregoing effective diameter. For the primary side lobe, the secondary side lobe, the tertiary side lobe, and in some cases, side lobes of higher orders appearing around the main lobe at the center, the side lobe intensity is kept below about 5% of that of the main lobe. As compared with the phase variable filters 50, 60 and 70, the side lobe intensity can be inhibited to below a half with a constant spot diameter.

Figure 21:
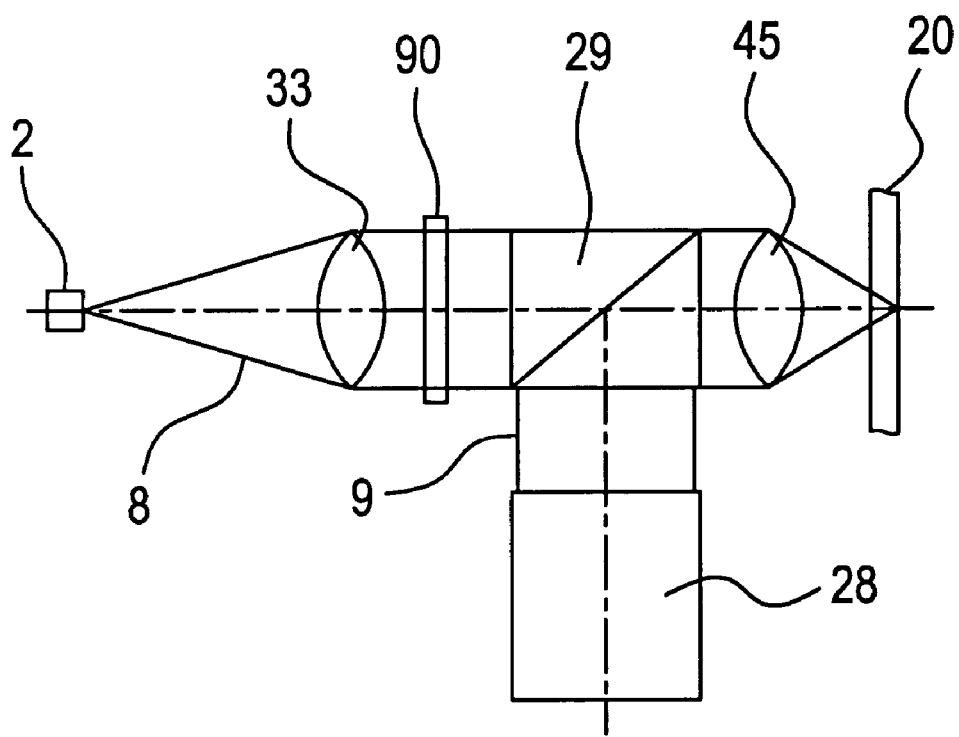
FIG. 21 illustrates an element for converting the optical phase difference distribution for an infinite system optical head.

The above-mentioned phase variable filter is inserted into a system using a finite type objective lens shown in FIG. 10. The same effects as above are available even by inserting the filter into a system using an infinite type objective lens as shown in FIG. 21. The laser beam 8 emitted from the semiconductor laser 2 is converted into a parallel beam by passing through a collimator lens 33, further passes through a phase variable filter 90, a beam splitter 29 and the objective lens 45, and is condensed onto the optical disk 20. The laser beam 9 reflected from the optical disk 20 passes through the inverse path, is reflected by the beam splitter 29, and enters a detecting optical system 28, and a signal on the optical disk 20 is detected. The laser beam 8 passes through the phase variable filter 90 and is condensed through the objective lens, thereby permitting formation of a super-resolution spot on the optical disk. The phase variable filter 90 may have the same shape as those of the phase variable filters 50, 60, 70 and 80 shown in FIGS. 11(A)–(B), 15(A)–(B), 16(A)–(B) and 20(A)–(B).

As described in the first embodiment, in the optical head 21 as well, a signal of a higher resolution is available by adopting a numerical aperture larger than that specified in the DVD standard for the objective lens 5.

When using a super-resolution optical system, side lobes upon reducing the laser beam through the objective lens may pose a problem. In the optical head of this embodiment, therefore, this problem is coped with by a technique of shielding the side lobe components of the laser beam 9 reflected by the optical disk 20, entering the photodiodes 7.

Figure 22:
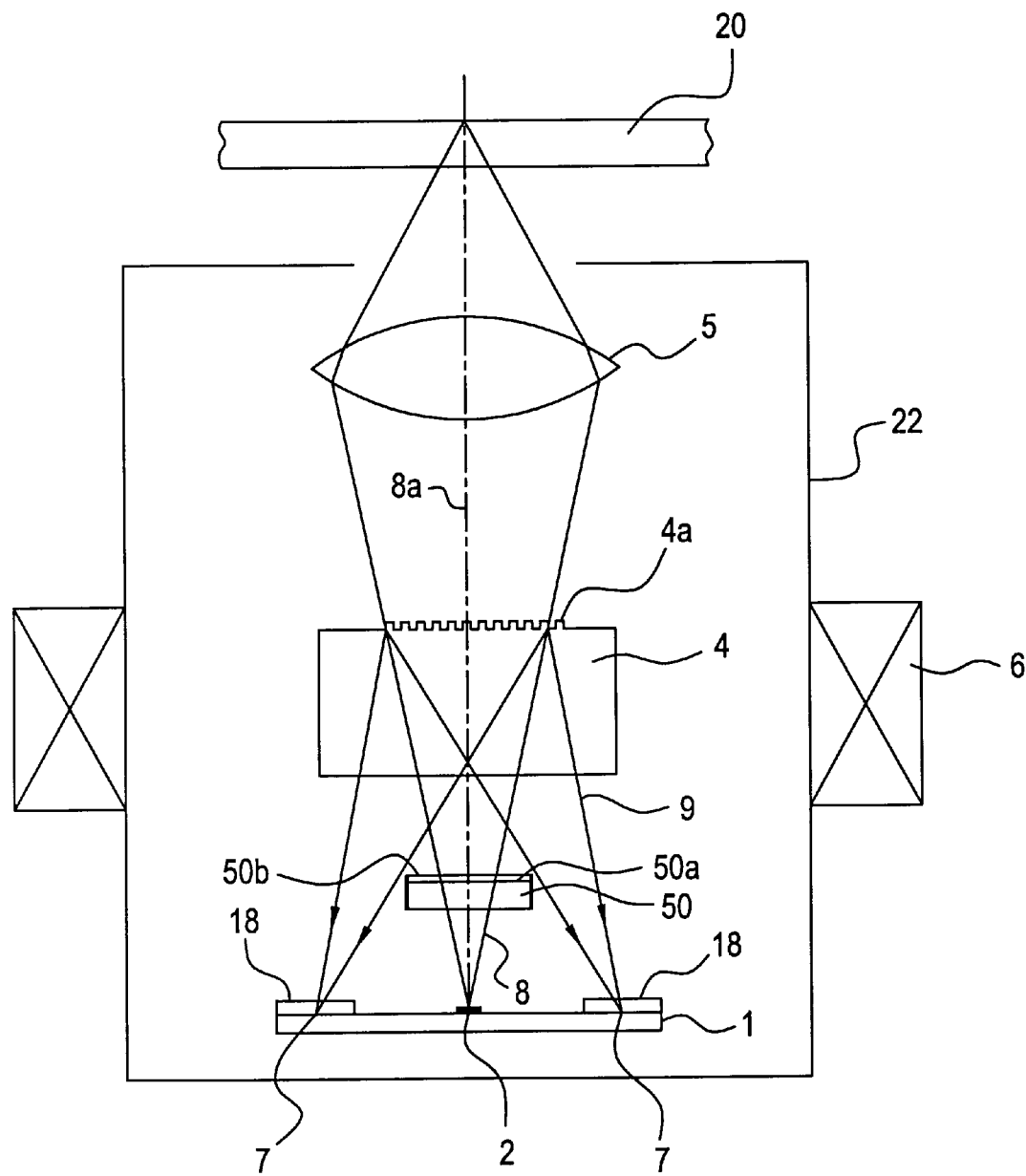
FIG. 22 illustrates a configuration of another optical head of the invention.

In the optical head 22 shown in FIG. 22, for example, a slit 18 having a longitudinal direction aligned with the radial direction of the optical disk is inserted near the condensing point of the reflected beam 9 between a hologram element 4 and the photodiodes 7, to shield the side lobe components in the tangential direction of the optical disk. (Because the configuration is the same as that of the optical head 21 shown in FIG. 10 except for the slit 18, description is omitted here.)

FIGS. 23(A)–(B) illustrate details of the slit section: FIG. 23(A) illustrates the aforesaid slit section in a case where a phase variable filter having properties equivalent to those shown in FIGS. 11(A)–(B) or 15(A)–(B) is used for the optical head. When using this phase variable filter, the side lobe components are generated only in a single axial direction. Therefore, a primary and all subsequent side lobe components 24, 25 and 26, and in some cases, a quaternary and subsequent components can be completely shielded by the slit 18. In this configuration, only the main lobe 23 passes through the slit 18 and arrives at the photodiodes 7.

FIG. 23(B) illustrates the foregoing slit section in a case where a phase variable filter having properties equivalent to those shown in FIGS. 16(A)–(B) or 20(A)–(B) is used for the optical head. When using this phase variable filter, side lobe components appear as if they drew concentric circles around the optical axis center. A slit 18 therefore shields the tangential direction side of the optical disk to cover the primary and subsequent side lobe components 40, 41 and 42, and in some cases, even the quaternary and subsequent components.

In the optical head 21 shown in FIG. 10, it is also possible to cope with this problem by making a contrivance of the shape of the photodiodes in place of inserting the foregoing slit 18. More particularly, the photodiode 7 has a configuration not receiving the side lobe components by selecting a rectangular shape having a longer side aligned with the optical disk radial direction and a shorter side agreeing with the optical disk tangential direction, having a length just accommodating the main lobe of the laser spot. The reflected beam 9 is condensed on the photodiodes 7.

Figure 24A:
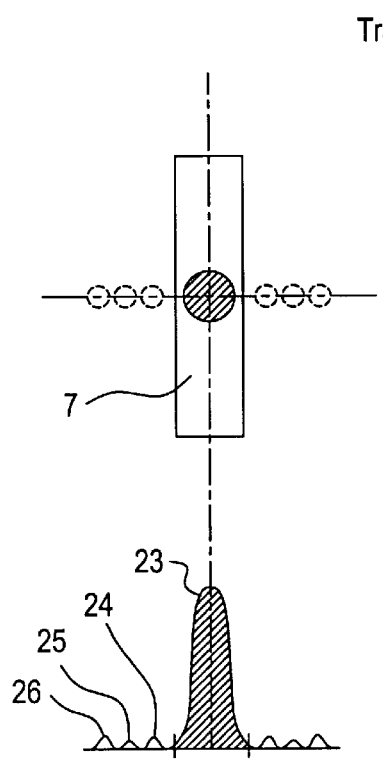
FIGS. 24(A)–(B) illustrate a laser beam at a photodiode when mounting the photodiode having a side lobe shielding function on the optical head shown in FIG. 10.
Figure 24B:
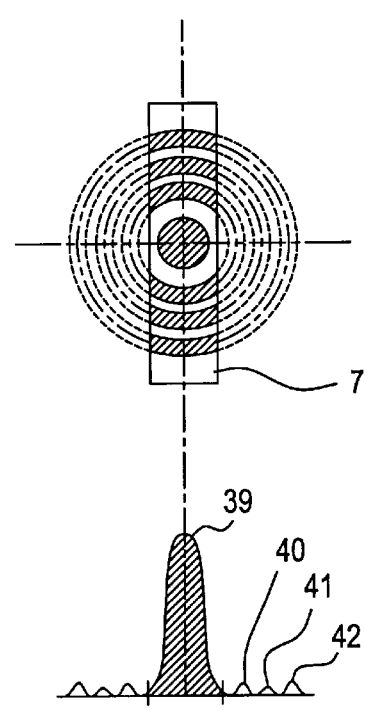

FIGS. 24(A)–(B) illustrate details of the photodiode section. FIG. 24(A) illustrates the aforesaid photodiode section in a case where there is used a phase variable filter having properties equivalent to those shown in FIGS. 11(A)–(B) or 15(A)–(B) for the optical head. Only the main lobe component 23 is receivable by the photodiode 7.

FIG. 24(B) illustrates the foregoing photodiode section in a case where there is used a phase variable filter having properties equivalent to those shown in FIGS. 16(A)–(B) or 20(A)–(B) for the optical head.

It is possible to mask optical disk tangential components including the primary, the secondary and the tertiary side lobes 40, 41 and 42, and in some cases, the quaternary and subsequent components of high orders.

By using the foregoing slit or photodiode, the side lobe components in the tangential direction of the optical beam reflected by the optical disk 20 are no more detected,, thus permitting improvement of the playback properties of the optical head.

The width of the foregoing split and the width of the shorter side of the photodiode should be appropriate for passing through the main lobe of the laser beam. When, for example, the primary side lobe intensity is low and poses no problem in playback properties, the width of the aforesaid shorter side may be set at a value just masking the secondary and subsequent side lobe components.

Even by shielding the side lobe components in the above-mentioned track tangential direction and detecting only the main lobe component by means of the photodiode, the regeneration signal properties may not sometimes be improved. An experiment has confirmed that, in such a case, an improvement effect is available by further shielding part of the main lobe component. An example is shown in FIGS. 25(A) and 25(B). FIGS. 25(A)–(B) illustrate the process in which, in a case where a narrow-width slit 9 is inserted in the optical disk track tangential direction in place of the slit 18 in the optical head 22 shown in FIGS. 22(A)–(B) as in FIGS. 23(A)–(B), the reflected beam 9 enters the slit 19. FIG. 25(A) illustrates the foregoing slit section in a case where a phase variable filter having properties equivalent to those shown in FIGS. 11(A)–(B) or 15(A)–(B) is used for the optical head. When using this phase variable filter, side lobe components appear only in an axial direction. It is therefore possible to completely shield the primary and subsequent side lobe components 24, 25 and 26, and in some cases, even the quaternary and subsequent components by means of the slit 19. In this configuration, a part of the main lobe 23 is also shielded. In the configuration shown in FIG. 25(A), only about 40% at the spot center portion in the track tangential direction of the main lobe 23 pass through the slit 19 and reach the photodiode 7.

FIG. 25(B) illustrates the foregoing slit section in a case where a phase variable filter having properties equivalent to those shown in FIGS. 16(A)–(B) or 20(A)–(B) is used for the optical head. As shown in FIG. 25(B), the slit 19 shields the primary and subsequent side lobe components 40, 41 and 42, and in some cases, even the quaternary and subsequent components on the track tangential direction side of the optical disk, and further a part of the main lobe 39 as in FIG. 25(A).

To avoid an adverse effect of diffraction at the main lobe 23 or 39, the foregoing slit has a thickness of up to 1 μm. The slit is manufactured by evaporating a metal such as chromium onto an optical glass and etching the same.

The problem may be coped with by making contrivances in the shape of the photodiode in place of inserting the above-mentioned slit 19. More specifically, the photodiode has a rectangular shape with a longer side agreeing with the optical disk radial direction, and a shorter side in the optical disk tangential direction having a width only partially receiving the main lobe of the laser spot.

FIGS. 26(A)–(B) illustrate details of the photodiode section. FIG. 26(A) illustrates the aforesaid photodiode section in a case where a phase variable filter having properties equivalent to those shown in FIGS. 11(A)–(B) or 15(A)–(B) is used for the optical head. The photodiode 7 can receive the beam in a state in which the main lobe component 23 is partially shielded.

FIG. 24(B) illustrates the foregoing photodiode section in a case where a phase variable filter having properties equivalent to those shown in FIGS. 16(A)–(B) or 20(A)–(B) is used for the optical head. It is possible to mask the primary, the secondary and the tertiary side lobe components 40, 41 and 42, and in some cases, even the quaternary and subsequent components of higher orders, and a part of the main lobe 39 component in the optical disk tangential direction.

By the use of the foregoing slit or photodiode, the photodiode no longer detects a part of the main lobe component in the optical beam tangential direction, reflected from the optical disk 20. In an experiment, the main lobe was shielded gradually from the both sides of the optical disk track tangential direction. As a result, the playback property of the optical head was gradually improved, and a point giving the best property was found in shielding of about 60% (30% for each of the sides) of the intensity diameter. By shielding the main lobe in the optical disk track tangential direction, it may be possible to improve the playback property of the optical head.

The same effect is available also in combination of the foregoing slit and photodiode with the optical intensity distribution converting means such as a super-resolution element using the aspherical optical system shown in the first embodiment, a super-resolution element using a mask plate, or a super-resolution element using a filter having a low transmissivity at the center.

Use of the optical head of this embodiment in combination with an objective lens having a numerical aperture of 0.64, or in combination with the partial response method or the PRML method is also possible. A configuration of the optical recording apparatus is achievable by replacing the optical head 10 shown in FIG. 9 with the optical head of the present embodiment. Such a configuration, described in detail in the first embodiment, is not described here.

Third Embodiment

Figure 27:
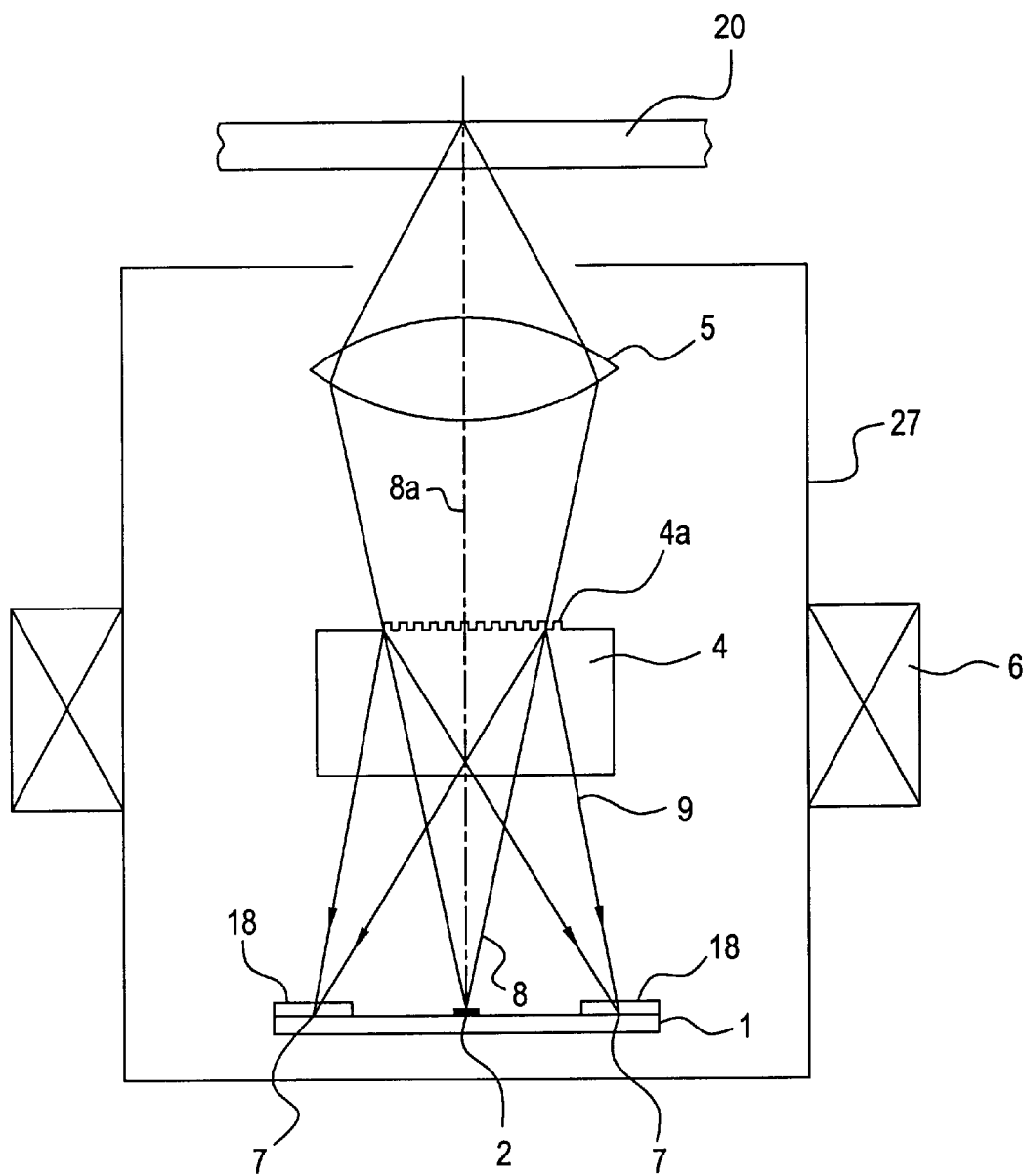
FIG. 27 illustrates a configuration of an optical head of a third embodiment of the invention.

FIG. 27 illustrates a third embodiment of the optical head of the invention. The optical head 27 of this embodiment comprises a semiconductor laser 2 arranged substantially at the center of a semiconductor substrate 1, a plurality of photodiodes 7 provided around the semiconductor substrate 1 with the semiconductor laser 2 as the center, a hologram element 4 having a hologram pattern 4a for signal separation for separating a reflected beam, an objective lens 5 which condenses the laser beam, and a shielding mask 19, in which focusing and tracking control of an optical disk 20 can be accomplished by a magnetic actuator 6 for the entire optical head 27.

The semiconductor laser 2 of the optical head 27 of this embodiment is also a near-infrared semiconductor laser having a wavelength of 0.78 μm, and a laser beam 8 emitted from the semiconductor laser 2 enters the objective lens 5, and is condensed on the recording surface of the optical disk 20. A reflected beam 9 reflected from the optical disk 20, passes through an inverse optical path, is separated by the signal separating hologram pattern 4a in the direction of the photodiodes 7. After a part of the main lobe of the reflected beam 9 is shielded by the shielding mask 19 arranged at the condensing point of the reflected beam 9, the beam is received by the individual photodiodes 7, and the reflected beam intensity is converted into an electric signal for output.

In the optical head 27 shown in FIG. 27, the intensity diameter of the laser beam condensed onto the optical disk 20 becomes larger than 1.3 times the laser beam wavelength because an element for producing an optical super-resolution phenomenon is not inserted. The head 27 cannot therefore be used as a recording head for an optical recording medium having a track pitch substantially equal to, or narrower than, the laser beam wavelength. However, it is possible to use it as a playback head by inserting a shielding mask 19 at a position near the condensing point of the reflected beam 9.

Figure 28A:
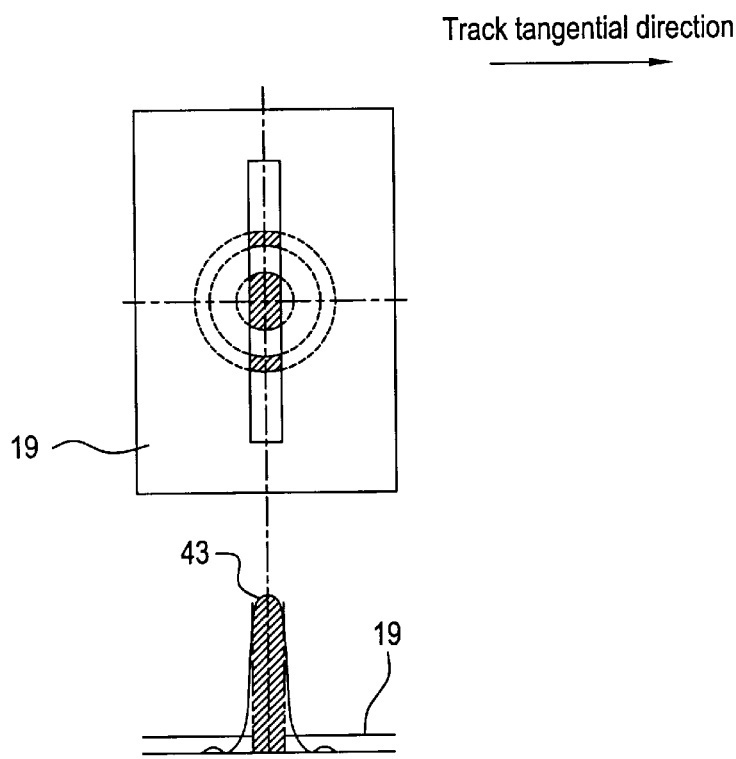
FIG. 28(A) illustrates a laser beam at a shielding slit of the optical head shown in FIG. 27.

FIG. 28(A) illustrates the shielding mask 19 and portions surrounding the same. The shielding mask 19 is inserted near the condensing point of the reflected beam 9 condensed toward the photodiodes 7, and a part of the main lobe 43 in the optical disk track tangential direction is shielded in the same manner as the shielding mask 19 shown in FIGS. 25(A)–(B). By increasing the quantity of insertion of the shielding masks inserted from both sides of the main lobe 43 in the optical disk track tangential direction, the playback signal property is gradually improved, and the shielding effect reaches its maximum at a point where 30% on one side (60% in total) of the spot diameter in the optical disk track tangential direction of the main lobe are shielded at the condensing point. In this state, the result of an experiment permits confirmation of the fact that the playback signal property from an optical recording medium having an average track pitch substantially equal to, or narrower than, the laser beam wavelength is equivalent to that available when using an optical head of the DVD standard, mounting a laser having a wavelength of 0.63 μm or 0.65 μm. Because a laser having a long wavelength of 0.78 μm is used, it is also possible to accomplish recording or regeneration onto or from a CD-R, and regeneration from a CD.

To avoid an adverse effect of diffraction at the shielding section, the foregoing shielding mask 19 has a thickness of up to 1 μm.

Figure 28B:
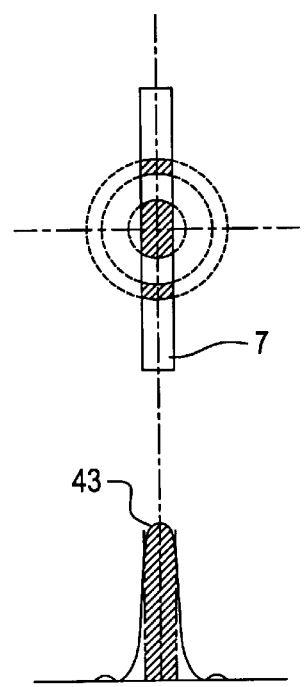
FIG. 28(B) illustrates a laser beam at a photodiode when removing the shielding slit from the optical head shown in FIG. 27 and mounting a photodiode having the side lobe shielding function.

FIG. 28(B) illustrates a case where a similar effect is available by making contrivances, not using a shielding mask, but using a special photodiode shape. In this case, the condensing point of the reflected beam 9 is on the photodiodes 7, and the shielding width of the main lobe 43 in the optical disk track tangential direction is determined on the basis of the width of the photodiodes 7.

In the optical head 27 of this embodiment as well, it is possible to use in combination with an objective lens having a numerical aperture of 0.64, or in combination with the partial response method or the PRML method. A configuration of the optical recording apparatus is achievable by replacing the optical head 10 shown in FIG. 9 with the optical head of the present embodiment. Such a configuration, described in detail in the first embodiment, is not described here.

Actually, an experiment was carried out on an optical head as shown in FIG. 27 by using a laser source having a wavelength of 0.78 μm and a finite type objective lens having a numerical aperture (NAi: numerical aperture in an image space) of 0.65 and magnifications of 4.5 times, and further, by inserting a concave lens between a hologram element 4 and photodiodes 7. The concave lens was designed to give a numerical aperture of 0.035 for the laser beam entering the photodiodes 7. In this case, the ratio of the wavelength to the numerical aperture on the object side is 22.3 (0.78 μm/0.035). This value of 22.3 μm becomes an indicator of the spot diameter of the main lobe condensing toward the photodiodes 7. The spot diameter at the aforesaid condensing point in this embodiment was actually measured as about 19.0 μm. Widths of the shielding masks 19 in the optical disk track tangential direction were provided from 19 μm at intervals of 0.5 μm and the masks were inserted sequentially near the condensing point. The best jitter value was achieved when a shielding mask passing through a width of 7.6 μm which was about 40% (i.e., when 5.7 μm were shielded on one side). The shielding masks 19 were removed, and an experiment was carried out with a pattern width in the optical disk track tangential direction of photodiodes 7 of 7.6 μm as shown in FIG. 28(B), and a result similar to that described above was obtained.

Figure 29:
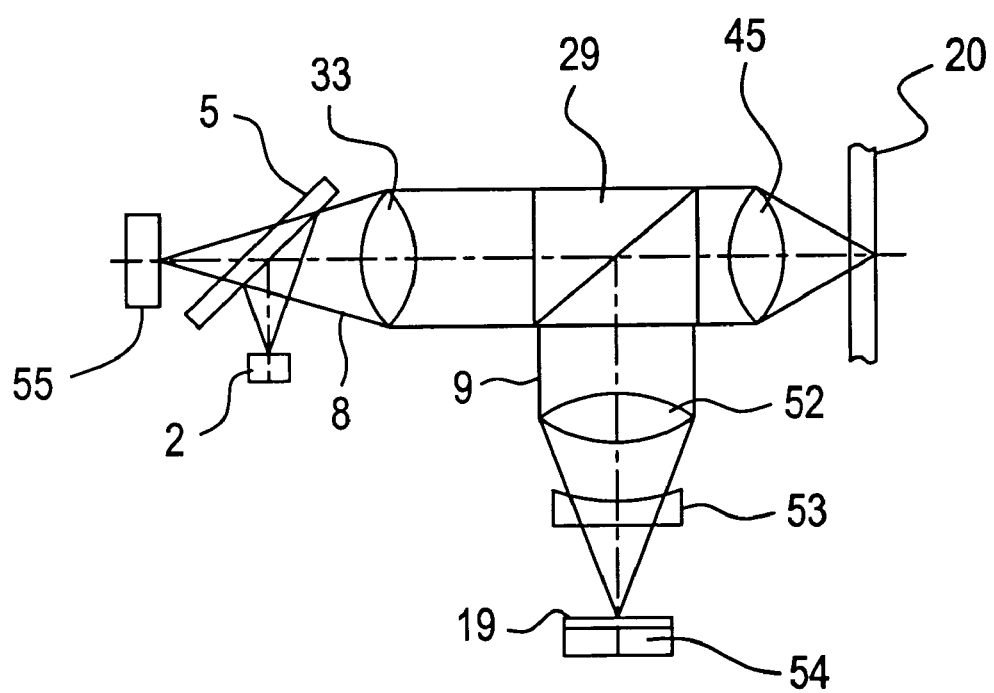
FIG. 29 illustrates a configuration of another optical head of a third embodiment of the invention.

A case where an infinite type objective lens is used in an optical head is illustrated in FIG. 29. A laser beam emitted from a semiconductor laser 2 is reflected at a beam splitter 51, then becomes a parallel beam while passing through a collimator lens 33, enters an objective lens 45, and is condensed onto a recording surface of an optical disk 20. The reflected beam reflected from the optical disk 20 enters the beam splitter 29 through an inverse optical path. A part of the beam passes through the beam splitter 29, the collimator lens 33 and then another beam splitter 51, is condensed in a photodiode 55, and the intensity of the reflected beam is converted into an electric signal for output. A focus error signal and a track error signal are determined from the output of this photodiode 55. On the other hand, another part of the reflected beam from the optical disk 20 is reflected at the beam splitter 29, passes through a detecting lens 52 and a concave lens 53, is condensed at a shielding mask 19, and enters a photodiode 54. The intensity of the reflected beam is converted into an electric signal, and an information signal recorded in the optical disk is put out. In the optical head shown in FIG. 29, the semiconductor laser is a laser source having a wavelength of 0.78 μm, and the objective lens 45 is an infinite type one having a numerical aperture (NAi) of 0.64. The detecting lens 52 and the concave lens 53 are designed so that the reflected beam 9 entering the photodiode 54 has a numerical aperture of 0.05. In this case, the ratio of the wavelength to the numerical aperture of the reflected beam 9 entering the photodiode 54 is 15.6. This value 15.6 μm becomes an indicator for the spot diameter of the main lobe condensing toward the photodiode 7. The actually measured spot diameter at the foregoing condensing point in this embodiment was about 13.3 μm. The optical disk track tangential direction widths of the shielding mask 19 were provided from 13.3 μm at intervals of 0.5 μm, and the masks were inserted sequentially near the condensing point. Upon insertion of the shielding mask passing through a width of about 40%, i.e., 5.3 μm, (i.e., 4.0 μm for each side shielded), the best jitter value was obtained.

As another embodiment, in the optical head shown in FIG. 29, the semiconductor laser 2 had a wavelength of 0.78 μm and the objective lens had a numerical aperture (NAi) of 0.65. The detecting lens 52 and the concave lens 53 were designed so that the reflected beam 9 entering the photodiode has a numerical aperture of 0.02. In this case, the ratio of the wavelength to the numerical aperture of the reflected beam 9 entering the photodiode 54 is 39. This value of 39 μm becomes an indicator for the spot diameter of the main lobe condensing toward the photodiodes 7, and the actually measured spot diameter at the foregoing condensing point in this embodiment was about 33 μm. The optical disk track tangential direction widths of the shielding masks 19 were provided from 33 μm at intervals of 0.5 μm. Upon sequential insertion near the condensing point, the best jitter value was obtained with the shielding mask passing through a width of about 40%, i.e., 13.2 μm, (i.e., 9.9 μm for each side shielded). When using an infinite type objective lens, similar effects were available by shielding the main lobe by means of the optical disk track tangential direction widths of the photodiode 54 pattern.

When reducing the numerical aperture of the laser beam entering the photodiode, there occurs an increase in the distance between the detecting lens condensing the laser beam onto the photodiode (a finite type objective lens in the case of the optical head 27 shown in FIG. 27) and the photodiode, thus leading to a larger optical head. On the other hand, when increasing the foregoing numerical aperture, the intensity diameter of the laser beam condensed near the photodiode becomes smaller, thus requiring a narrower shielding mask or photodiode. When trying to mass-produce shielding masks at a low cost, processing of narrow one is difficult. Also in the formation of photodiodes, a narrow-width pattern is not practicable. Positional adjustment upon assembling the optical head is also difficult. When considering the side of the optical head, processing of shielding masks or photodiodes, the width of the shielding mask in the optical disk track tangential direction or the pattern width of photodiode in the optical disk track tangential direction should preferably be within a range of from 3 to 13 μm. That is, the numerical aperture of the laser beam entering the photodiode should be up to about 0.1, or more preferably, from 0.02 to 0.05, or further more preferably, about 0.035.

By selecting the foregoing numerical aperture, it becomes possible to process a shielding mask or a photodiode, and by shielding a part of the main lobe, regeneration is achievable from an optical recording medium having an average track pitch substantially equal to, or narrower than, the wavelength of the laser beam. Downsizing of the optical head is possible at the same time.

An objective lens having a numerical aperture of 0.65 is used in the present embodiment. As a result of an experiment, there is no problem regarding coma, and this objective lens is well practicable up to 0.66.

In the optical head of the present embodiment as well, as described above, it is possible to process in a group optical disks of different properties such as regeneration of a high-density DVD and a CD-R excellent in properties on the longer wavelength side.

INDUSTRIAL APPLICABILITY

According to the present invention, as described above, there are provided an optical head and an optical recording apparatus which permit recording and regeneration of a conventional CD-R with no problem, and process an optical recording medium of the DVD standard corresponding to a high recording density. With a laser beam having a wavelength of 0.65 μm under the DVD standard, a CD-R would have a reflectivity of about 15% which is absorbed almost completely. While there is a risk of destruction of data recorded in a CD-R even with a regeneration power of a DVD, the optical head and the optical recording apparatus permit use with 0.78 μm leading to a very high reflectivity, thus allowing safe processing without the risk of destruction of information.

In the optical head and the optical recording apparatus of the present invention, a semiconductor laser having a relatively long wavelength can be used relative to the track pitch of the optical recording medium. It is therefore possible to provide an optical head and an optical recording apparatus which overcome the limit on efforts toward a higher density, and permit recording and regeneration at a high recording density at a low cost with a high reliability. An optical head and an optical recording apparatus capable of coping with a higher density in the future can also be provided.

What is claimed is:

1. An optical head having a laser source emitting a laser beam and an objective lens condensing said laser beam onto an optical recording medium, the optical head performing at least one of recording and regeneration of information onto and from said optical recording medium provided with an average track pitch substantially equal to a wavelength of said laser beam or narrower than said wavelength, the optical head comprising:

an optical intensity distribution converting device that converts an optical intensity distribution of said laser beam irradiated to said objective lens so that said laser beam emitted from said objective lens produces an optical super-resolution phenomenon.

2. An optical head according to claim 1, wherein said laser beam has a wavelength of about 0.78 μm, and said objective lens has a numerical aperture of about 0.64.

3. An optical head according to claim 1, wherein said optical intensity distribution converting device includes an aspherical optical system in which a peripheral optical intensity of said laser beam is increased compared to an optical intensity at a center of said laser beam on an incident pupil of said objective lens.

4. An optical head according to claim 3, wherein said aspherical optical system is a finite system.

5. An optical head according to claim 4, further comprising:

a detecting lens which condenses a reflected beam reflected from said optical recording medium;

detecting means which detects said reflected beam; and means for shielding at least side lobe components of said reflected beam in a track tangential direction of the optical recording medium.

6. An optical head according to claim 3, wherein said aspherical optical system collimates said laser beam.

7. An optical head according to claim 6, further comprising:

a detecting lens which condenses a reflected beam reflected from said optical recording medium;

detecting means which detects said condensed reflected beam; and means for shielding at least side lobe components of said reflected beam in a track tangential direction of the optical recording medium.

8. An optical head according to claim 1, wherein:

said optical intensity distribution converting device produces a peripheral optical intensity of said laser beam from 1.5 to 3.5 times as high as an optical intensity at a center of said laser beam on an incident pupil of said objective lens.

9. An optical head according to claim 1, wherein:

said optical intensity distribution converting device produces a peripheral optical intensity of said laser beam about twice as high as an optical intensity at a center of said laser beam on an incident pupil of said objective lens.

10. An optical head according to claim 1, wherein:

said optical intensity distribution converting device comprises means for shielding a center portion of an incident pupil of said objective lens or filtering means for giving a distribution to a transmissivity of the laser beam.

11. An optical head comprising a laser source which emits a laser beam, condensing means which forms a spot having an intensity diameter $1/e^2$ of up to 1.3 times a wavelength of said laser beam in a track tangential direction of an optical recording medium thereon, and detecting means which detects a reflected beam reflected from said optical recording medium, wherein:

said condensing means is provided with an objective lens facing said optical recording medium and optical intensity distribution converting means which converts an optical intensity distribution of said laser beam irradiated to said objective lens so that said laser beam emitted from said objective lens produces an optical super-resolution phenomenon.

12. An optical head according to claim 11, wherein:

said laser beam has a wavelength of about 0.78 μm, and said objective lens has a numerical aperture of about 0.64.

13. An optical head according to claim 11, wherein:

said optical intensity distribution converting means includes an aspherical optical system in which a peripheral optical intensity of said laser beam can be increased over an optical intensity at a center of said laser beam on an incident pupil of said objective lens.

14. An optical head according to claim 13, wherein:

said aspherical optical system is a finite system.

15. An optical head according to claim 13, wherein:

said aspherical optical system collimates said laser beam.

16. An optical head according to claim 11, wherein:

said optical intensity distribution converting means produces a peripheral optical intensity of said laser beam from 1.5 to 3.5 times as high as an optical intensity at a center of said laser beam on an incident pupil of said objective lens.

17. An optical head according to claim 11, wherein:

said optical intensity distribution converting means produces a peripheral optical intensity of said laser beam about twice as high as an optical intensity at a center of said laser beam on an incident pupil of said objective lens.

18. An optical head according to claim 11, wherein:

said optical intensity distribution converting means comprises means for shielding a center portion of an incident pupil of said objective lens or filtering means for giving a distribution to a transmissivity of the laser beam.

19. An optical head having a laser source emitting a laser beam and an objective lens condensing said laser beam onto an optical recording medium, the optical head performing at least one of recording and regeneration of information onto and from said optical recording medium provided with an average track pitch substantially equal to a wavelength of said laser beam or narrower than said wavelength, the optical head comprising:

a phase difference device that imparts a phase difference to said laser beam irradiated to said objective lens so that said laser beam emitted from the objective lens produces an optical super-resolution phenomenon.

20. An optical head according to claim 19, wherein:

said laser beam has a wavelength of about 0.78 $\mu$m, and said objective lens has a numerical aperture of about 0.64.

21. An optical head according to claim 19, wherein:

said phase difference device comprises a variable phase filter which imparts a phase difference of about 180° to a plurality of belt-shaped regions of said laser beam entering said objective lens having a longitudinal direction defined as a track vertical direction of said optical recording medium.

22. An optical head according to claim 19, wherein:

said phase difference device comprises a variable phase filter which imparts a phase difference of about 180° to a plurality of ring-shaped regions at a center portion of an optical axis of said laser beam entering said objective lens.

23. An optical head according to claim 19, wherein:

said phase difference device is filtering means comprising a substrate of a constant reflective index having concave and convex portions on a surface of said substrate or filtering means comprising a substrate having a variable reflective index.

24. An optical head comprising a laser source which emits a laser beam, condensing means which forms a spot having an intensity diameter 1/e² of up to 1.3 times a wavelength of said laser beam in a track tangential direction of an optical recording medium thereon, and detecting means which detects a reflected beam reflected from said optical recording medium; wherein:

said condensing means includes an objective lens facing said optical recording medium and a phase difference device that imparts a phase difference to said laser beam entering said objective lens so that said laser beam emitted from said objective lens produces an optical super-resolution phenomenon.

25. An optical head according to claim 24, wherein:

said laser beam has a wavelength of about 0.78 $\mu$m, and said objective lens has a numerical aperture of about 0.64.

26. An optical head according to claim 24, wherein:

said phase difference device comprises a variable phase filter which imparts a phase difference of about 180° to a plurality of belt-shaped regions of said laser beam entering said objective lens having a longitudinal direction defined as a track vertical direction of said optical recording medium.

27. An optical head according to claim 24, wherein:

said phase difference device comprises a variable phase filter which imparts a phase difference of about 180° to a plurality of ring-shaped regions at a center portion of an optical axis of said laser beam entering said objective lens.

28. An optical head according to claim 24, wherein:

said phase difference device is filtering means comprising a substrate of a constant reflective index having concave and convex portions on a surface of said substrate or filtering means comprising a substrate having a variable reflective index.

29. An optical head comprising:

a laser source emitting a laser beam;

an objective lens which condenses said laser beam onto an optical recording medium;

a detecting lens which detects a reflected beam reflected from said optical recording medium;

detecting means which detects the reflected beam; and filtering means which imparts a phase difference to the laser beam emitted from said laser source; wherein said optical head has means for shielding at least side lobe components of said reflected beam in a track tangential direction of the optical recording medium, and said optical head performs at least one of recording and regeneration of information onto and from said optical recording medium provided with an average track pitch substantially equal to a wavelength of said laser beam or narrower than said wavelength.

30. An optical head according to claim 29, wherein:

said laser beam has a wavelength of about 0.78 $\mu$m, and said objective lens has a numerical aperture of about 0.64.

31. An optical head according to claim 29, wherein:

said filtering means comprises a substrate of a constant reflective index having concave and convex portions on a surface of said substrate or said filtering means comprises a substrate having a variable reflective index.

32. An optical head having a laser source emitting a laser beam and an objective lens condensing said laser beam onto an optical recording medium, the optical head performing regeneration of information from said optical recording medium provided with an average track pitch substantially equal to a wavelength of said laser beam or narrower than said wavelength, the optical head comprising:

a detecting lens which condenses a reflected beam reflected from the optical recording medium, detecting means which detects the reflected beam, and means for shielding an intensity diameter of said reflected beam by about 30%, respectively, from both sides in a track tangential direction of the optical recording medium, wherein the laser beam entering said detecting means has a numerical aperture of up to about 0.1.

33. An optical head according to claim 32, wherein:

said laser beam has a wavelength of about 0.78 μm, and said objective lens has a numerical aperture of about 0.64.

34. An optical recording apparatus which has an optical head condensing a laser beam emitted from a laser source onto an optical recording medium through an objective lens and generating an information signal recorded on said optical recording medium by a reflected beam reflected from said optical recording medium, said information signal from said optical recording medium being provided with an average track pitch substantially equal to, or narrower than, a wavelength of said laser beam, the optical recording apparatus comprising:

a signal processing device which processes said information signal by a partial response method.

35. An optical recording apparatus according to claim 34, wherein:

said signal processing device further conducts decoding processing by a maximum-likelihood decoding method.

36. An optical recording apparatus according to claim 34, wherein:

said optical head has optical intensity distribution converting means for converting an optical intensity distribution of said laser beam entering said objective lens so that said laser beam emitted from said objective lens produces an optical super-resolution phenomenon.

37. An optical recording apparatus according to claim 34, wherein:

said optical head comprises a phase difference device that imparts a phase difference to said laser beam entering said objective lens so that said laser beam emitted from said objective lens produces an optical super-resolution phenomenon.

38. An optical recording apparatus according to claim 34, wherein:

said laser beam has a wavelength of about 0.78 μm, and said objective lens has a numerical aperture of about 0.64.

* * * * *